US009407868B2

(12) United States Patent  
Woodgate et al.

(10) Patent No.: US 9,407,868 B2  
(45) Date of Patent: Aug. 2, 2016

(54) CONTROLLING LIGHT SOURCES OF A DIRECTIONAL BACKLIGHT

(71) Applicant: RealD Inc., Beverly Hills, CA (US)

(72) Inventors: Graham J. Woodgate, Henley-on-Thames (GB); Michael G. Robinson, Boulder, CO (US); Adrian J. Hill, Lyons, CO (US)

(73) Assignee: RealD Inc., Beverly Hills, CA (US)

( * ) Notice: Subject to any disclaimer, the term of this patent is extended or adjusted under 35 U.S.C. 154(b) by 0 days.

(21) Appl. No.: 14/306,690

(22) Filed: Jun. 17, 2014

(65) Prior Publication Data

US 2014/0368602 A1 Dec. 18, 2014

Related U.S. Application Data

(60) Provisional application No. 61/835,923, filed on Jun. 17, 2013.

(51) Int. Cl.
  *H04N 7/15* (2006.01)
  *H04N 13/00* (2006.01)
  (Continued)

(52) U.S. Cl.
  CPC .............. *H04N 7/15* (2013.01); *G06T 7/0042* (2013.01); *H04N 7/144* (2013.01); *H04N 13/0018* (2013.01); *H04N 13/0022* (2013.01); *H04N 13/0239* (2013.01); *G06T 2207/10012* (2013.01);
  (Continued)

(58) Field of Classification Search
  USPC .................. 348/14.07, 14.08, 47, 48, E5.058; 382/103, 173, 181, 130, 164, 171, 216
  See application file for complete search history.

(56) References Cited

U.S. PATENT DOCUMENTS

| 6,014,164 A | 1/2000 | Woodgate et al. |
| 7,052,168 B2 | 5/2006 | Epstein et al. |

(Continued)

FOREIGN PATENT DOCUMENTS

| CN | 1487332 A | 4/2004 |
| CN | 1307481 C | 3/2007 |

(Continued)

OTHER PUBLICATIONS

International search report and written opinion of international searching authority in co-pending PCT/US2014/042721.

(Continued)

*Primary Examiner* — Yosef K Laekemariam
(74) *Attorney, Agent, or Firm* — Neil G. J. Mothew; Penny L. Lowry

(57) ABSTRACT

Teleconferencing is performed between two telecommunication devices having a display device and a stereoscopic pair of cameras positioned outside opposed sides of the display device at the same level partway along those sides. The separation between the centers of the cameras is in a range having a lower limit of 60 mm and an upper limit of 110 mm to improve the perceived roundness in a displayed stereoscopic image of a head. In captured stereo images that are video images, a head is segmented and the segmented backgrounds are replaced by replacement images that have a lower degree of perceived stereoscopic depth to compensate for non-linear depth perception in the displayed stereo images. Images are shifted vertically to position an eye-line of a detected face at the level of the stereoscopic pair of cameras of the telecommunication device where the images are displayed, improving the naturalness of the displayed image.

20 Claims, 28 Drawing Sheets

(51) Int. Cl.
*H04N 7/14* (2006.01)
*H04N 13/02* (2006.01)
*G06T 7/00* (2006.01)

(52) U.S. Cl.
CPC . *G06T 2207/30201* (2013.01); *H04N 2007/145* (2013.01); *H04N 2213/001* (2013.01)

(56) References Cited

U.S. PATENT DOCUMENTS

| | | | |
|---|---|---|---|
| 7,073,933 | B2 | 7/2006 | Gotoh et al. |
| 7,101,048 | B2 | 9/2006 | Travis |
| 7,430,358 | B2 | 9/2008 | Qi et al. |
| 9,197,884 | B2 | 11/2015 | Lee et al. |
| 2004/0109303 | A1 | 6/2004 | Olczak |
| 2005/0110980 | A1 | 5/2005 | Maehara et al. |
| 2005/0180167 | A1 | 8/2005 | Hoelen et al. |
| 2005/0190345 | A1 | 9/2005 | Dubin et al. |
| 2006/0291243 | A1 | 12/2006 | Niioka et al. |
| 2009/0174700 | A1 | 7/2009 | Daiku |
| 2010/0295920 | A1* | 11/2010 | McGowan ............ H04N 7/144 348/14.08 |
| 2011/0043142 | A1 | 2/2011 | Travis et al. |
| 2011/0242277 | A1 | 10/2011 | Do et al. |
| 2011/0242298 | A1 | 10/2011 | Bathiche et al. |
| 2012/0002295 | A1 | 1/2012 | Dobschal et al. |
| 2012/0075285 | A1 | 3/2012 | Oyagi et al. |
| 2012/0169838 | A1* | 7/2012 | Sekine ............ H04N 7/15 348/14.16 |
| 2014/0340728 | A1 | 11/2014 | Taheri |

FOREIGN PATENT DOCUMENTS

| | | |
|---|---|---|
| CN | 101029975 A | 9/2007 |
| CN | 101049028 A | 10/2007 |
| CN | 100449353 | 1/2009 |
| CN | 100591141 | 2/2010 |
| EP | 0721131 A2 | 7/1996 |
| KR | 20120048301 A | 5/2012 |
| KR | 10-2013-0002646 A | 1/2013 |

OTHER PUBLICATIONS

Office Action for Chinese Patent Application No. 201380026059.1 dated Apr. 25, 2016.

Office Action for Chinese Patent Application No. 201380049451.8 dated Apr. 5, 2016.

* cited by examiner

CONTROLLING LIGHT SOURCES OF A DIRECTIONAL BACKLIGHT

CROSS-REFERENCE TO RELATED APPLICATIONS

This application is related to and claims priority to U.S. Provisional Patent Application No. 61/835,923, filed Jun. 17, 2013, entitled "Depth corrected autostereoscopic video conferencing apparatus and method thereof," the entirety of which is herein incorporated by reference.

TECHNICAL FIELD

This disclosure generally relates to illumination of spatial light modulators, and more specifically relates to directional backlights for providing large area illumination from localized light sources for use in 2D, 3D, and/or autostereoscopic display devices. This disclosure relates generally to electronic devices that have a stereoscopic pair of cameras that capture stereo images for display stereoscopically or autosterescopically. In some aspects, the disclosure relates to electronic devices that telecommunication devices that can transfer captured images over a telecommunication network.

BACKGROUND 3D displays (also referred to as stereoscopic or stereo displays) are becoming more common. 3D displays display stereo images (left and right images) stereoscopically so that the left image is directed to the left eye and the right image is directed to the right eye of an observer, creating the perception of depth in the image. The initial commercial growth of 3D displays has been in cinema and later in electronic display devices such as may be used in televisions and computer monitors, and typically require the use of additional user-worn equipment such as a pair of glasses to separate the left and right images, for example using polarization or shuttering. Autostereoscopic 3D display devices that direct left and right images to the left and right eyes of the observer autostereoscopically, without the user of additional equipment, are also under development.

The application to mobile electronic devices such as telecommunication devices that communicate over a telecommunication network is desirable to enhance the quality of social interaction using such devices. Autostereoscopic 3D display devices for such mobile electronic devices would be preferable but are not yet widely implemented commercially in such applications.

For use with existing commercial 3D displays, the stereo images are often generated by an organization and supplied to users, a typical example being 3D films generated by film companies. For future uses, it will be desirable for the electronic device to include a stereoscopic pair of cameras for capture of stereo images locally on the device.

It is known to implement teleconferencing in telecommunication devices by transmitting images of the face of the users captured by a camera on the telecommunication devices over a telecommunication network. This increases the accessibility of face-to-face communication to users, indeed allowing it wherever the telecommunication device is capable of communication. Such teleconferencing could be improved by using a telecommunication device that includes a stereoscopic pair of cameras and capturing and transmitting stereo images to another device that is capable of displaying the stereo images

BRIEF SUMMARY

The first aspect of the present disclosure is concerned with the provision of teleconferencing using a source telecommunication device including a display device and a stereoscopic pair of cameras that transmits images of a face captured by the stereoscopic pair of cameras to a destination device for display. In particular, it is concerned with improving the quality of the social interaction perceived by the user of the destination device.

According to a first aspect of the present disclosure, there is provided a teleconferencing method performed using: a source telecommunication device that comprises a display device and a stereoscopic pair of cameras positioned outside opposed sides of the display device at the same level partway along those sides; and a destination telecommunication device that comprises a display device and at least one camera, the source telecommunication device and the destination telecommunication device being capable of communication over a telecommunication network, the method comprising: transmitting delivery images captured by one or both of the stereoscopic pair of cameras of the source telecommunication device from the source telecommunication device to the destination telecommunication device, and transmitting return images captured by the at least one of the camera of the destination telecommunication device from the destination telecommunication device to the source telecommunication device; detecting a face in the return images; shifting the return images vertically to position an eye-line of the detected face at the level of the stereoscopic pair of cameras of the source telecommunication device upon display of the shifted return images on the display device of the source telecommunication device in a predetermined orientation in which the vertical sides of the image are aligned with said opposed sides of the display device; and displaying the shifted return images on the display device of the source telecommunication device in said predetermined orientation.

This aspect of the invention involves processing of the return images transmitted back to the source telecommunication device from the destination telecommunication device. By detecting a face in the return images, the return image may be shifted vertically to position an eye-line of the detected face at the level of the stereoscopic pair of cameras of the source telecommunication device upon display. As a result, the eye-line of the displayed face of the destination observer is held at the level of the stereoscopic pair of cameras of the source telecommunication device. During social interaction, the point of interest of the source observer will tend often to be on the eye-line of the displayed face, and so this processing tends to position the gaze of the source observer at the same vertical level as the cameras.

This means that when the delivery images are displayed, the gaze of the source observer will be perceived by the destination observer to be vertically directed at him/her. This contrasts with the case that a camera of the source telecommunication device is above the display device, in which case the gaze of the source observer will be perceived by the destination observer to be vertically directed at him/her. The human visual system has evolved high sensitivity to the cues gained from the relative position of the iris and white sclera of other observers during social interaction. Small errors in the perceived gaze direction can create unnatural interactions. Creating the perceived effect that the source observer has a gaze improves the efficacy of the telecommunication system in providing teleconferencing.

Further, according to the first aspect of the present disclosure, there may be provided a telecommunication system, a source telecommunication device, a destination telecommunication device, or server for provision in a telecommunication network, in which a similar method is implemented.

The second aspect of the present disclosure is concerned with optimization of the quality of human social interaction provided by images captured by a stereoscopic pair of cameras positioned outside opposed sides of a display device of an electronic device such as a telecommunication device. In this regard, it would be desirable to minimise distortion of the head shape that is perceived when a stereo image of a head is displayed stereoscopically.

According to a second aspect of the present disclosure, there is provided an electronic device comprising: a display device that is capable of displaying stereo images autostereoscopically; and a stereoscopic pair of cameras positioned outside opposed sides of the display device at the same level partway along those sides, the separation between the centers of the cameras being in a range having a lower limit of 55 mm and an upper limit of 110 mm.

It has been appreciated that the distortion of perceived head shape is dependent on the geometry of the delivery image capture and display environments. Furthermore, it has been appreciated that perceived roundness of the head shape can be achieved when the ratio between lateral and longitudinal magnification is approximately 1:1 in the region of viewing interest. Taking into account that in the case of teleconferencing the region of interest will be the user's head that will tend to be close to the electronic device, it has been discovered that the range of acceptable separations between the centers of the cameras of the stereoscopic pair are in a surprisingly narrow range.

The third aspect of the present disclosure is concerned with the generation of stereo images by a stereoscopic pair of cameras. In this regard, it would be desirable to minimise distortion of the image that is perceived when a stereo image of a head is displayed stereoscopically.

According to a third aspect of the present disclosure, there is provided a method of generating stereoscopic images, comprising: capturing stereo images that are video images of a head and, optionally, a torso by a stereoscopic pair of cameras; in each of the stereo images, segmenting the head and, if present, the torso from the backgrounds; in each of the stereo images, replacing the segmented backgrounds by respective replacement images that have a degree of perceived stereoscopic depth within the replacement images that is lower than degree of perceived stereoscopic depth within the original backgrounds.

By replacing the segmented backgrounds in each image of the stereo delivery images by respective replacement images that have a lower degree of perceived stereoscopic depth within the replacement images than within the original backgrounds, the overall quality of the image including a foreground including the head and, if present, torso and a background can be improved. In comparison with the use of the raw background in the stereo image, a background with an improved level of visual comfort arising from a lower range of background disparity can be achieved. This is a particular benefit when the capture of stereo is optimised for the foreground, in which case the resultant disparity of the background may be inappropriate.

Further, according to the third aspect of the present disclosure, there may be provided a telecommunication system, a source telecommunication device, a destination telecommunication device, or server for provision in a telecommunication network, in which a similar method is implemented.

The various aspects of the present invention and the various features thereof may be applied together in any combination.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which.

DETAILED DESCRIPTION

Figure 1:
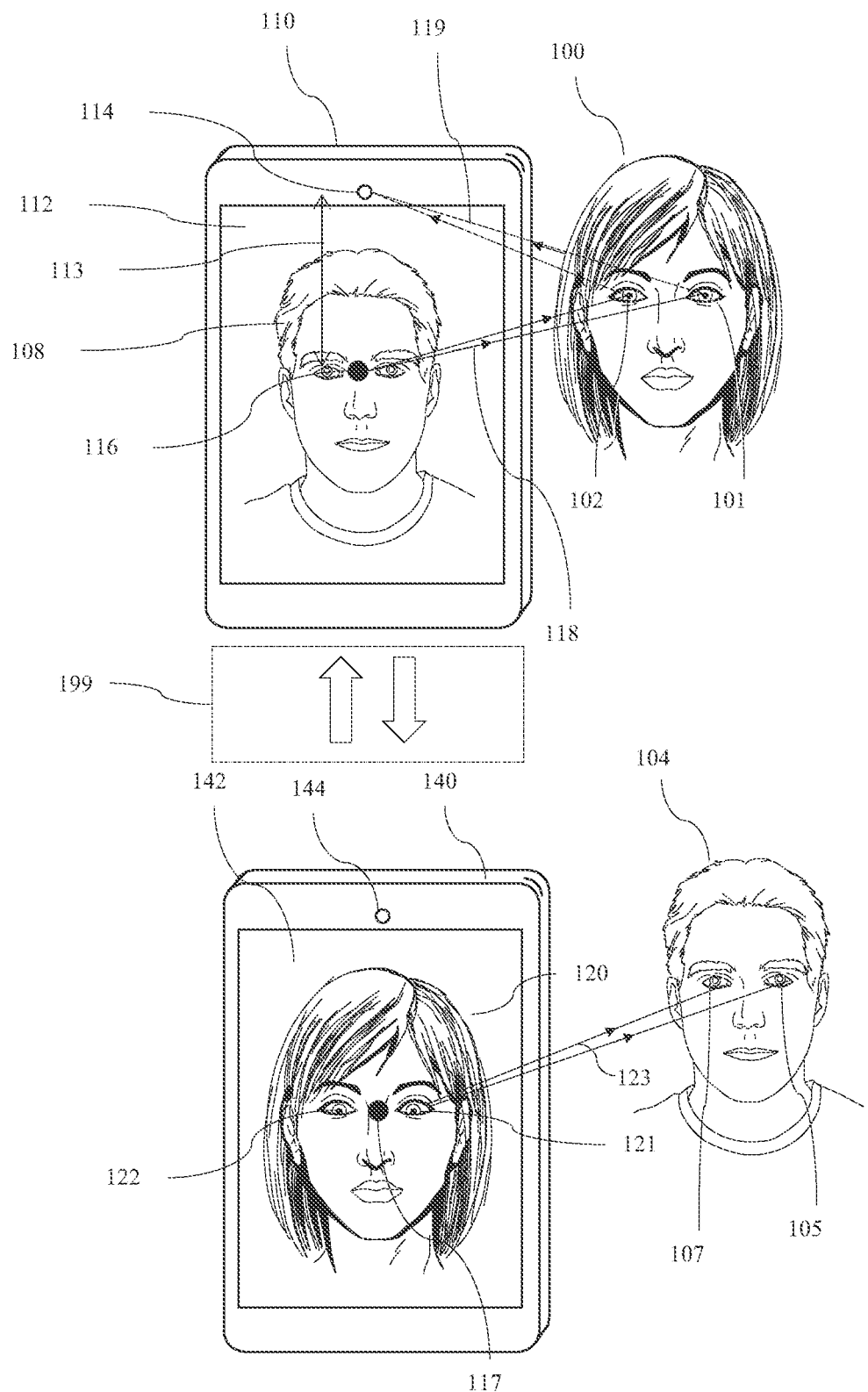
FIG. 1 is a schematic diagram illustrating a front view of a telecommunications system comprising 2D displays and single cameras, in accordance with the present disclosure.

Various hereinafter described embodiments relate to a telecommunication system including two telecommunication devices that communicate over a telecommunication network 199. In general the communication may occur in both directions, as is conventional.

The telecommunication network 199 may be any type of telecommunication network over which images and other data may be transmitted, including but not limited to wired and wireless networks, cellular networks, TCP (Transmission Control Protocol)/IP (Internet Protocol) networks and other computer networks. The telecommunication network 199 may communicate over any type of transmission channel and may include plural networks of the same or different types in the path between the source telecommunication device 110 and the destination telecommunication device 140.

The telecommunication devices may be any devices suitable for communicating over the telecommunication network 199, typically with a network interface suitable for the type of telecommunication network 199.

The telecommunication devices may be mobile telecommunication devices that communicate wirelessly with a telecommunication network 199 that is wireless, for example a cellular network including base stations or a wireless computer network such as a WiFi, with which the telecommunication devices communicate wirelessly. Of course such wireless networks may include wired transmission paths, for example between the base stations in a cellular network as is conventional. Although this is not limitative, in the case of mobile telecommunication devices, the devices themselves are of limited size in order to allow for portability, for example of sizes typical for a mobile smartphone or tablet computer.

The hereinafter described embodiments relate to teleconferencing methods in which images that are captured and displayed are video images.

There are described some specific methods for communicating images that are implemented in the telecommunication systems, referring to the telecommunication devices by the labels "source" and "destination", with images being transmitted from the source telecommunication device to the destination telecommunication device being referred to as "delivery" images and the images being transmitted in the opposite direction from the destination telecommunication device to the source telecommunication device being referred to as "return" images. These labels are used merely for providing a clear description of the methods for communicating images. The same methods may be applied for communicating images in reverse direction in which case the labels "source", "destination", "delivery" and "return" are reversed. Where the methods are applied bi-directionally, the labels "source" and "destination" may be applied to both telecommunication devices, depending on the direction of communication being considered.

The hereinafter described embodiments include various elements in common. Such common elements are given the same reference numerals and, for brevity, the description thereof is not repeated but should be understood as applying to all embodiments in which the common element is present, subject to any subsequently described modifications.

FIG. 1 is a schematic diagram illustrating a front view of a source telecommunication device 110, and a destination telecommunication device 140 comprising a single camera 144 of a telecommunication system. The source telecommunication device 110 includes a single camera 114 and a display device 112 that is observed by a source observer 100. Similarly, the destination telecommunication device 140 includes a single camera 144 and a display device 142 observed by a destination observer 104. For clarity, the source observer 100 and the destination observer 104 are shown in a reversed orientation here and in other drawings.

The source telecommunication device 110 and the destination telecommunication device 140 are capable of communication over a telecommunication network 199. Images are transmitted over the telecommunication network 199 as follows in a teleconferencing method. The source telecommunication device 110 transmits delivery images 120 captured by its camera 114 to the destination telecommunication device 140 which displays the delivery images 120 on its display device 142. Similarly, the destination telecommunication device 140 transmits return images 108 captured by its camera 144 to the source telecommunication device 110 which displays the return images 108 on its display device 112.

In the source telecommunications device 110 the monoscopic (single lens) camera 114 is positioned above the display device 112. A point of interest 116 on a return image 108 displayed on the display device 112 is observed by left eye 101 and right eye 102 of the source observer 100. The point of interest 116 may be located on a return image 108 comprising the face of the destination observer 104, for example being typically the location between the eyes 105, 107 of the destination observer 104. As the camera 114 is positioned above the display device 112, the point of interest 116 may be displaced by a vertical distance 113 from the camera 114. Light rays from the point of interest 116 on the display device 118 to the eyes 101, 102 of the source observer 100 thus have a substantially different directionality to light rays 119 from the eyes 101, 102 to the camera 114.

Destination telecommunications device 140 includes a display device 142 and a camera 144. The delivery image 120 of the source observer 100 captured by the camera 114 of the source device 110 is displayed on the destination display device 142 with point of interest 117 that may be between the eyes 121, 122 of the source observer 100 in the delivery image 120. The destination observer 104 with left and right eyes 105, 107 respectively may observe the point of interest 117 and would desirably receive a source image that appears to be looking into the eyes of the destination observer. However, because of the difference in direction of rays 118, 119 at the source telecommunications device 110, the source observer 100, as observed by the destination observer 104 observing the delivery image 120, appears to be looking below the direction of the destination observer's line 123 of gaze to the point of interest 122.

The human visual system has evolved high sensitivity to the cues gained from the relative position of the iris and white sclera of other observers during social interaction. Small errors in the perceived gaze direction can create unnatural interactions. The perceived effect of the source observer 100 appearing to have a downwards gaze is highly disconcerting to the destination observer 104 and impacts on the ability of the source observer 100 and destination observer 104 to communicate with each other, thereby reducing the efficacy of the telecommunication system in providing teleconferencing. It would be desirable to achieve corrected gaze for observers connected by means of telecommunication devices.

Figure 2:
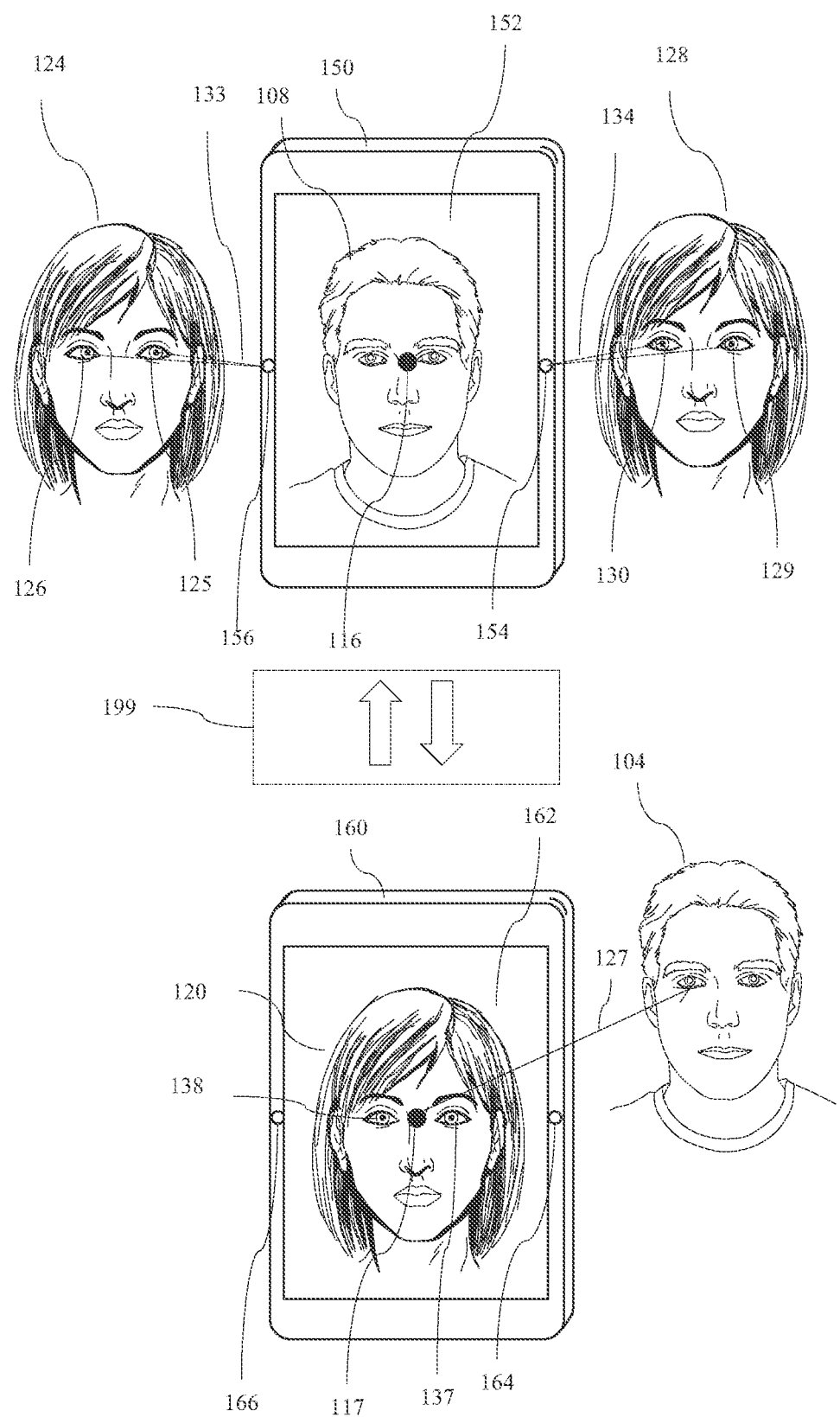
FIG. 2 is a schematic diagram illustrating a front view of a telecommunications system comprising autostereoscopic 3D displays and stereoscopic cameras, in accordance with the present disclosure.

FIG. 2 is a schematic diagram illustrating a front view of a source telecommunication device 150 and a destination telecommunication device 160 of a telecommunication system. The source display device 150 includes a stereoscopic pair of cameras 154, 156 and autostereoscopic display device 152 that is observed by a source observer 100. Similarly, the destination telecommunication device 160 includes a stereoscopic pair of cameras 164, 166 and an autostereoscopic display device 162 observed by a destination observer 104.

The autostereoscopic display devices 152 and 162 are capable of displaying stereo images autostereoscopically, so that the source observer 100 and destination observer 104 perceive the stereo images with a stereoscopic effect.

The source telecommunication device 150 and the destination telecommunication device 160 are capable of communication over a telecommunication network 199. Here, and in the hereinafter described embodiments, images are transmitted over the telecommunication network 199 as follows in a teleconferencing method. The source telecommunication device 150 transmits stereo delivery images 120 captured by its stereoscopic pair of cameras 154, 156 to the destination telecommunication device 160 which displays the delivery images 120 on its display device 162. Similarly, the destination telecommunication device 160 transmits stereo return images 108 captured by its stereoscopic pair of cameras 164, 166 to the source telecommunication device 150 which displays the return images 108 on its display device 152.

In the source telecommunication device 150, the stereoscopic pair of cameras 154, 156 are positioned outside opposed sides of the display device 152, being the vertical sides in FIG. 2, at the same level partway along those sides. The cameras 154, 156 of the source telecommunications device 150 may respectively capture a right image 124 with right eye iris and sclera structures 125, 126, and a left image 128 with left eye iris and sclera structures 129, 130, the right and left images 124, 128 being stereo images. When the source observer 100 is observing a point of interest 116 on the return image 108 displayed on the display device 152, there remains the perceived effect described above with reference to FIG. 1 that the source observer 100 appears to the destination observer 104 to have a gaze downwards. That perceived effect is reduced because the stereoscopic pair of cameras 154, 156 are positioned outside opposed sides of the display device 152, and so the cameras 154, 156 are generally closer vertically to the point of interest 116 than in the case of FIG. 1, but in general the point of interest 116 may not be at the level of the cameras 154, 156 especially as source telecommunication device 150 moves with respect to the source observer 100.

The stereo delivery image 120 may comprise left and right eye delivery images 137, 138, corresponding to the left and right images 124 and 126 respectively, that are displayed on the display device 162 autosterescopically. The destination observer 104 observes a point of interest 117 on the display device 162 that is typically located between the eyes of the source observer 100 in the delivery image 120. Considering the horizontal direction, the destination observer 104 looking at the point of interest 117 along ray 127 will perceive a three dimensional image that is analogous to the real world social interaction, that is a stereoscopic image of the sclera and irises for each eye, in particular with respect to the structure of the remainder of the face. While each of the stereo pair images by themselves when viewed in 2D do not show corrected gaze, the human visual system has evolved to provide high discrimination of gaze direction for stereo imagery and thus gaze cues are achieved, providing a highly natural interaction medium. Thus, the destination observer 104 perceives that the source observer 100 has a gaze directed in his own horizontal direction (this does not consider the vertical effect on gaze discussed above).

Figure 3:
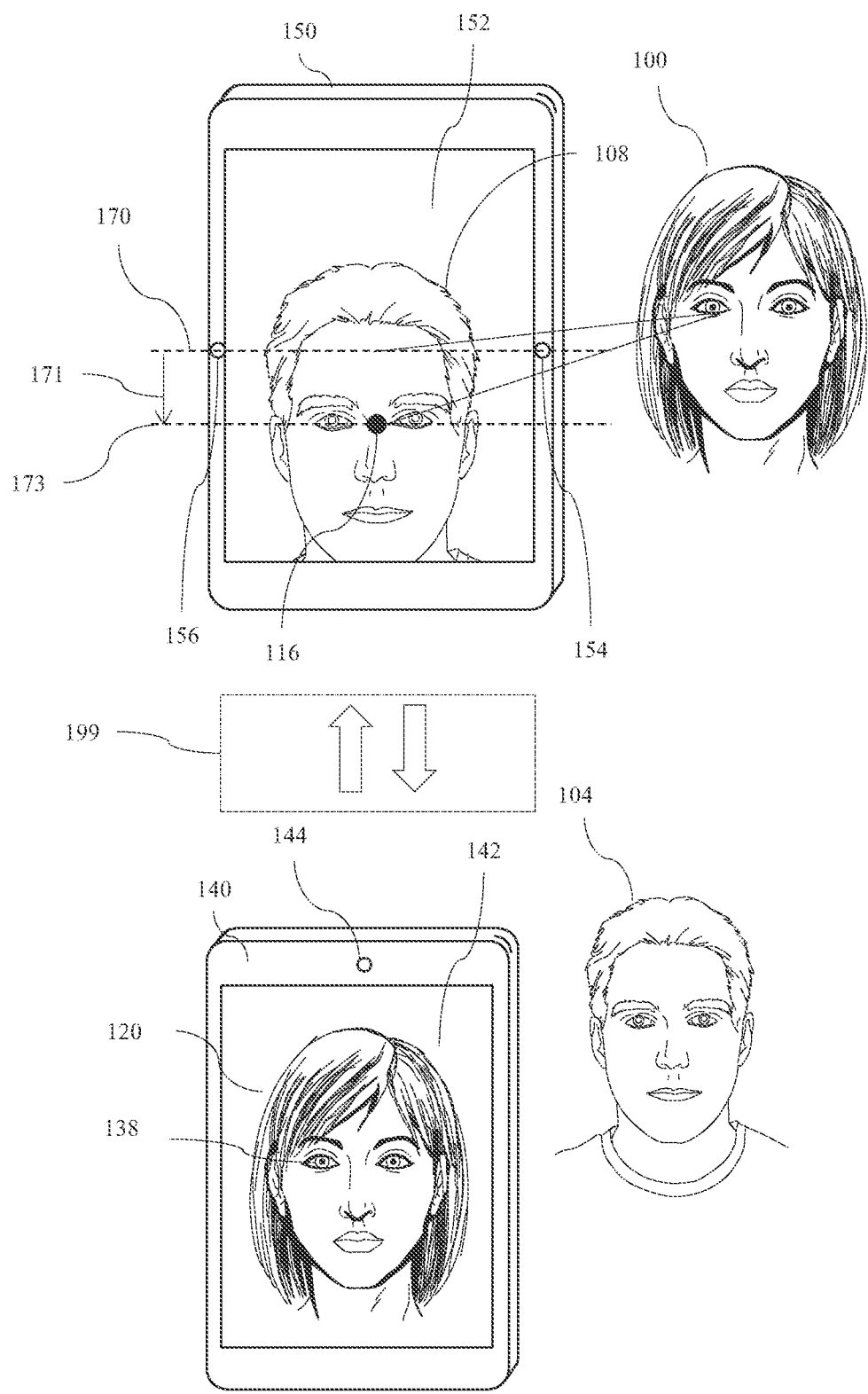
FIG. 3 is a schematic diagram illustrating a front view of a telecommunications system with vertical offset of return images, in accordance with the present disclosure.

FIG. 3 illustrates the case that the destination device displays the delivery image in 2D and is a schematic diagram illustrating a front view of a source telecommunication device 150 of the type shown in FIG. 2 and a destination telecommunication device 140 of the type shown in FIG. 1. In this case, the display device 142 of the destination telecommunication device 140 is not capable of displaying the stereo delivery image 120 autostereoscopically and so displays the delivery image 120 in 2D, typically by displaying one image 138 of the stereo delivery image 120.

In this case, the perceived effect described above with reference to FIGS. 1 and 2 that the source observer 100 appears to the destination observer 104 to have a gaze downwards, because the point of interest 116 that is on the eye-line of the destination observer 104 in the return image 108 may be positioned at a vertical height 171 below the camera line 170. The source observer 104 of return image 120 will thus appear not to be looking at the camera line 170. On observation on the destination device, the delivery image 142 will thus be perceived by the destination observer 104 to have a gaze below their own eye line, achieving an unnatural social interaction.

However, there is an additional effect considering the horizontal direction resulting from the fact that each of the left and right images 124, 128 considered individually may, when viewed on the display device 162, appear to have a gaze in different directions. Thus, the image 138 of the stereo delivery image 120 that is displayed on the display device 142 appears to the destination observer 104 to have a gaze that is directed sideways. This horizontal perceived effect on gaze causes similar issues to those caused by the vertical perceived effect on gaze described above resulting from the high sensitivity of the human visual system to the cues gained from the relative position of the iris and white sclera of other observers during social interaction.

Figure 4:
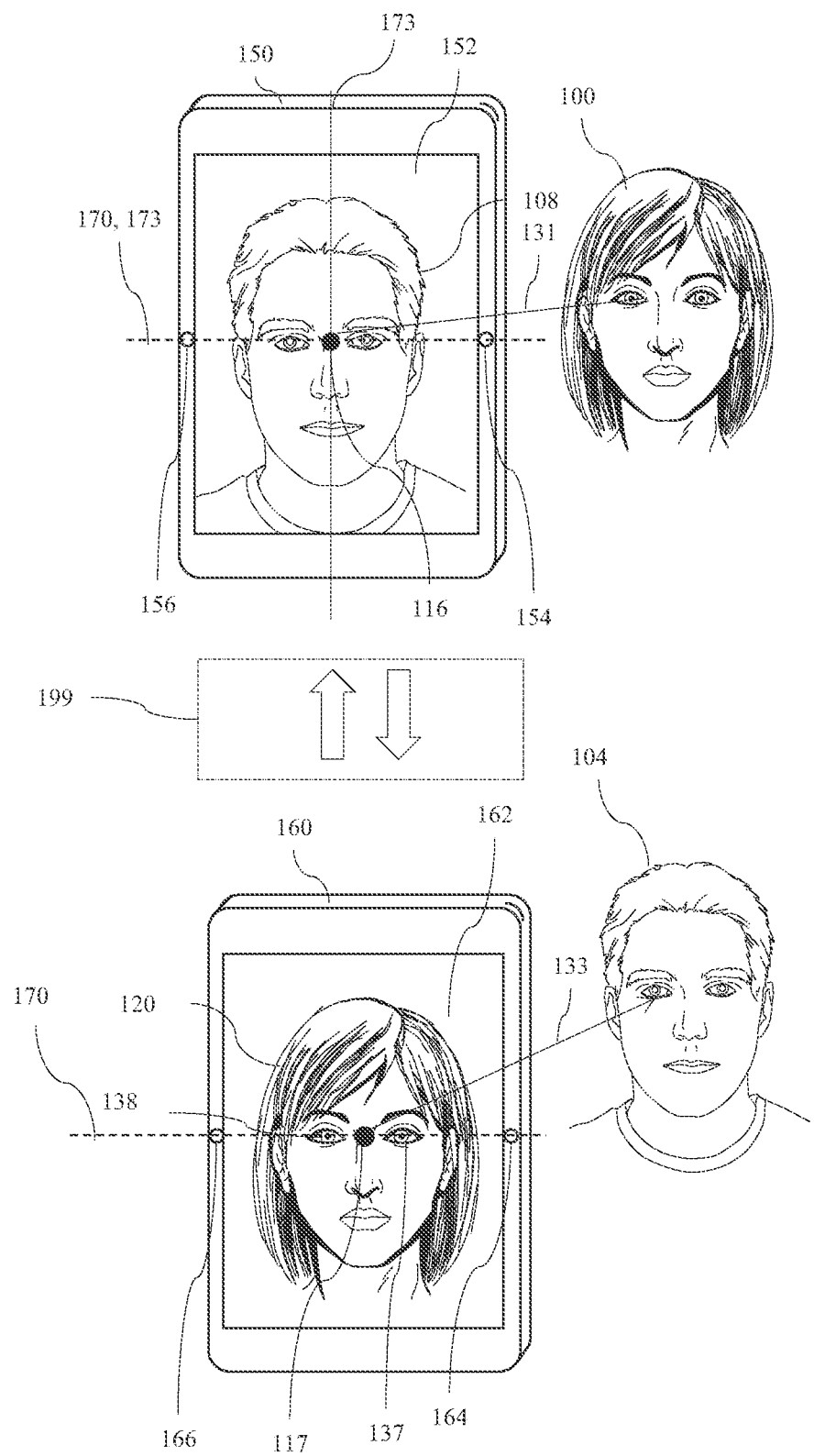
FIG. 4 is a schematic diagram illustrating a front view of a telecommunications system comprising autostereoscopic displays with shifted return images, in accordance with the present disclosure.
Figure 5:
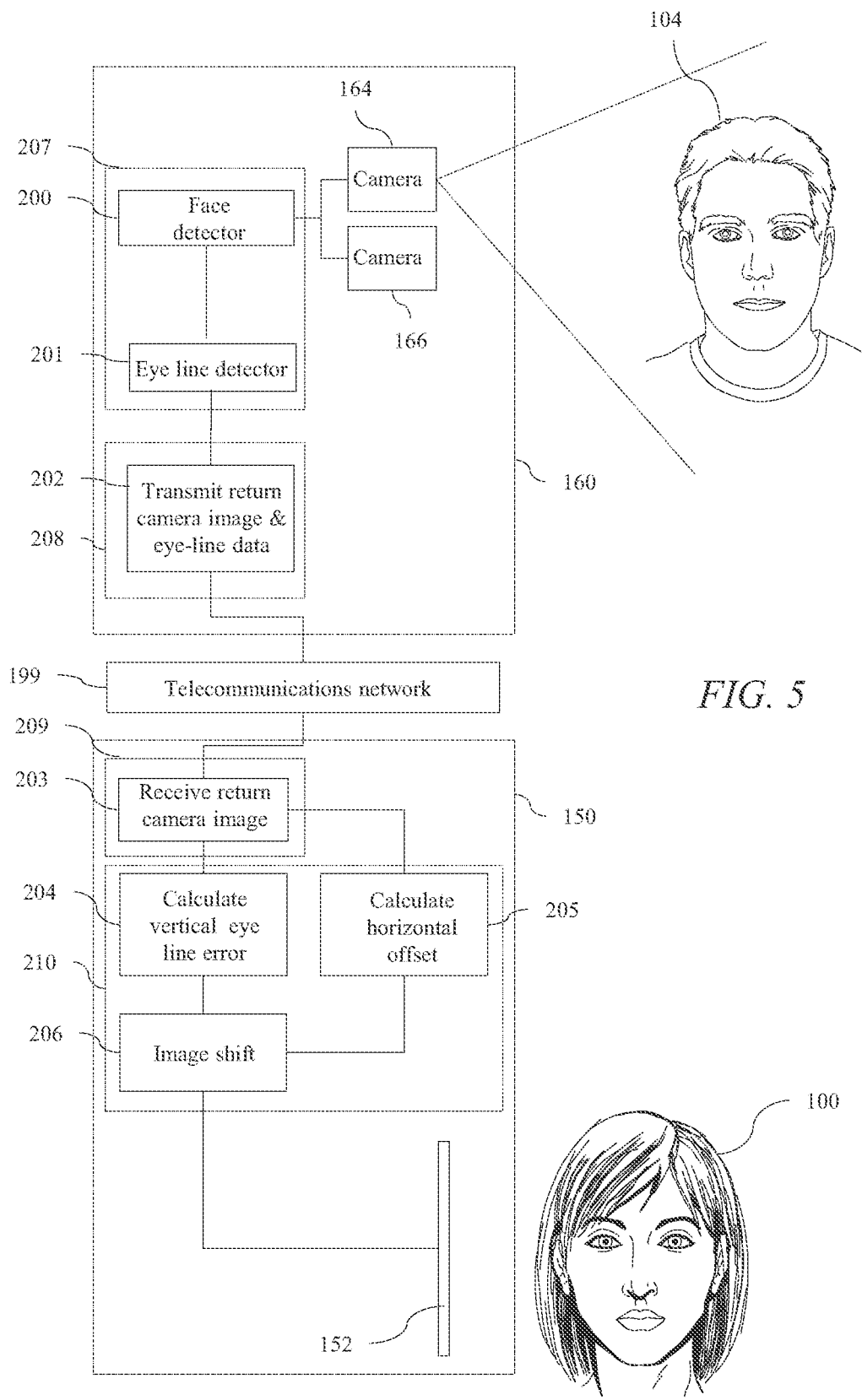
FIG. 5 is a schematic diagram illustrating a telecommunication system comprising a destination device capture system and means to correct delivery image position for a return image, in accordance with the present disclosure.

FIGS. 4 and 5 illustrate a telecommunication system of the type described with reference to FIG. 2 but in which there is implemented a teleconferencing method that reduces the perceived effect described above that the source observer 100 appears to the destination observer 100 to be looking down. FIG. 4 is a schematic diagram illustrating a front view of the source telecommunication device 150 and the destination telecommunication device 150 of the telecommunications system. FIG. 5 is a schematic diagram of the implemented method, illustrating processing performed on the return images 108. This method is performed whilst the source telecommunication device 150 is transmitting stereo delivery images 120 captured by its stereoscopic pair of cameras 154, 156 to the destination telecommunication device 160.

In a first step, the stereoscopic pair of cameras 164, 166 of the destination telecommunication device 160 captures stereo return images 108.

Steps 200 and 201 are performed in an image processing section 207 of the destination telecommunication device 160, and steps 204 to 206 in an image processing section 210 of the source telecommunication device 150. The image processing sections 207 and 210, and the other image processing sections described below, may be implemented by any suitable processing elements, for example a processer executing a suitable computer program or by dedicated hardware or by some combination of software and hardware.

Steps 202 and 203 are performed by a network interface 208 of the destination telecommunication device 160 and a network interface 209 of the source telecommunication device 150, respectively. The network interfaces 208 and 209 are interfaces with the telecommunication network 199 and may be provided by any elements suitable for implementing the communication protocol appropriate for the telecommunication network 199.

In a face detection step 200 performed by a face detector implemented in the image processing section 204, a face is detected in the return image 108. This may be performed using any suitable detection method, for example a feature detection method that detects features of a face such as eye features that identify parts of an eye and nose features that identify parts of the nose. The face detection step 200 may provide the locations of a set of features in the return image 108.

In an eye-line detection step 201 performed by an eye-line detector of the image processing section 204, the vertical level of the eye-line 173 of the detected face is detected. The vertical level of the eye-line 173 may be detected from the location of features detected in the face detection step 200. For example, the eye-line 173 may be detected from detected eye features, in which case the eye-line 173 may be defined relative to those eye features. The eye-line 173 may be detected in one or both of the stereo return images 108.

In the eye-line detection step 201, optionally there may also be detected the center line 174 of the detected face, being a vertical line extending through the notional center of the face. Again, the horizontal position of the center line 174 may be detected from the location of features detected in the face detection step 200. For example, the center line 174 may be detected from detected eye features and/or nose features, in which case the center line 174 may be defined relative to those eye features. The center line 174 may be detected in one or both of the stereo return images 108.

In a transmission step 202 performed by the network interface 208, the stereo return images 108, and associated data representing the detected the vertical level of the eye-line 173, and if detected the horizontal position of the center line 174, are transmitted by the destination telecommunication device 160 to the source telecommunication device 150.

In a reception step 203 performed by the network interface 209, the stereo return images 108 and the associated data are received by the source telecommunication device 150 from the destination telecommunication device 160.

In a vertical offset step 204 performed by the image processing section 210, there is calculated the vertical offset 171 between the vertical level 170 of the cameras 154, 156 along the sides of the display device 152 and the vertical level of the eye-line 173 when the stereo return images 108 are displayed on the display device 152 in a predetermined orientation (in FIG. 4 being a portrait orientation that is vertical), which is derived from the associated data transmitted from the destination telecommunication device 160.

In an optional horizontal offset step 205 performed by the image processing section 210, there is calculated the horizontal offset between center of the display device 152 and the horizontal position of the center line 174 when the stereo return images 108 are displayed on the display device 152 in a predetermined orientation (in FIG. 4 being a portrait orientation that is vertical), which is derived from the associated data transmitted from the destination telecommunication device 160.

In an image shift step 206 performed by the image processing section 210, the stereo return image 108 is shifted vertically by the vertical offset 171 calculated in the vertical offset step 204 and the horizontal offset calculated in the horizontal offset step 205, if performed.

In a final step, the shifted return image 108 is displayed on the display device 152 of the source telecommunication device 150 in the predetermined orientation.

Steps 202, 203 and 204 together perform a vertical shift which positions the eye-line 173 of the detected face 108 at the level 170 of the stereoscopic cameras 164, 166 upon display of the shifted return image 108 on the display device 152 of the source telecommunication device 150 in the predetermined orientation in which the vertical sides of the 108 image are substantially aligned with the opposed sides of the display device 152. In this manner the perceived error in gaze direction may be corrected and correct perceived gaze directions may be achieved for the return images 108. This avoids the disconcerting effect to the destination observer 104 and improves the ability of the source observer 100 and destination observer 104 to communicate with each other. It also holds the face of the source user 100 in a constant position vertically, even as the source device 150 moves relative to the source observer 100. This stabilizes the perceived return image 120. Both these effects increase the efficacy of the telecommunication system in providing teleconferencing.

Steps 202, 203 and 205 (if performed) together perform a horizontal shift which positions the center line 173 of the detected face centrally upon display on the display device 152 of the source telecommunication device 150 in the predetermined orientation. This holds the face of the source user 100 in a constant position horizontally, even as the source device 150 moves relative to the source user 150. This stabilizes the perceived return image 120, increasing the efficacy of the telecommunication system in providing teleconferencing. Further, this may achieve correction of face disparity, so to arrange the observer's eyes at the screen plane, optimizing image performance at the most critical part of the face for natural social interaction.

Further the correction method may be performed in respect of the delivery images 120 communicated in the opposite direction, so that the destination images 120 are also correctly observed. Rays 131 and 133 on both source and destination devices may thus be aligned to achieve matched gaze cues for both source and destination observers 100, 104 respectively.

FIG. 3 shows that the destination device may include a 2D display device and monoscopic camera, however preferably the destination device includes an autostereoscopic display device and stereoscopic camera as shown in FIG. 4. In general for teleconferencing it is desirable to arrange the predetermined orientation in a rectangular format display device 152 to be a portrait mode of operation. Thus the display device 152 may have one pair of opposed sides that is longer than the other pair of opposed sides, said pair of stereoscopic cameras 154, 156 of the source telecommunication device 150 being positioned outside the longer opposed sides of the display device 152.

The preferred eye line 173 may typically be arranged above the center line 174 of the display so that advantageously some of the return image torso is visible. Thus the pair of stereoscopic cameras 154, 156 of the source telecommunication device 150 may be positioned at the same level less than half-way along the longer opposed sides below the side of the display device that is the upper side with respect to said predetermined orientation.

Figure 6A:
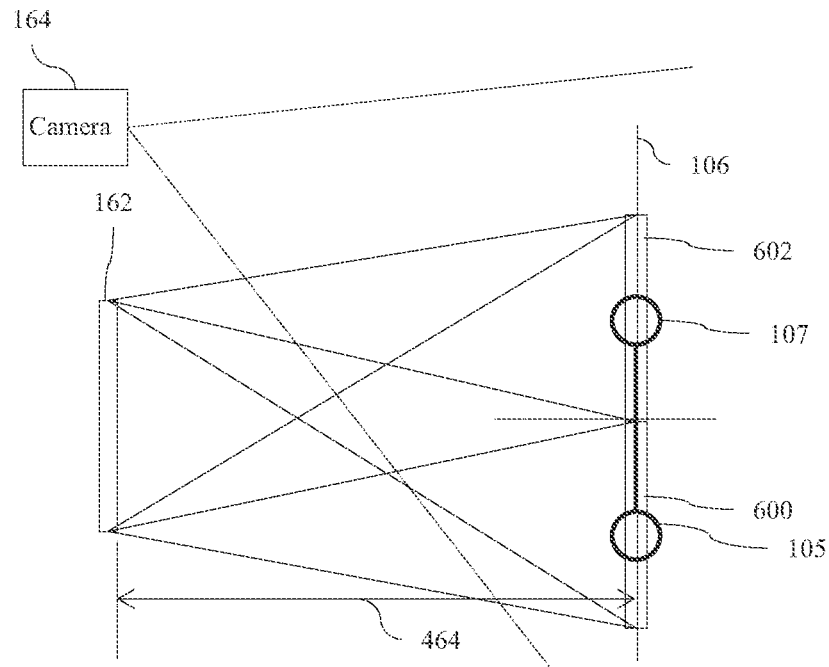
FIGS. 6A-B are schematic diagrams illustrating top views of an observer tracking autostereoscopic display, in accordance with the present disclosure.
Figure 6B:
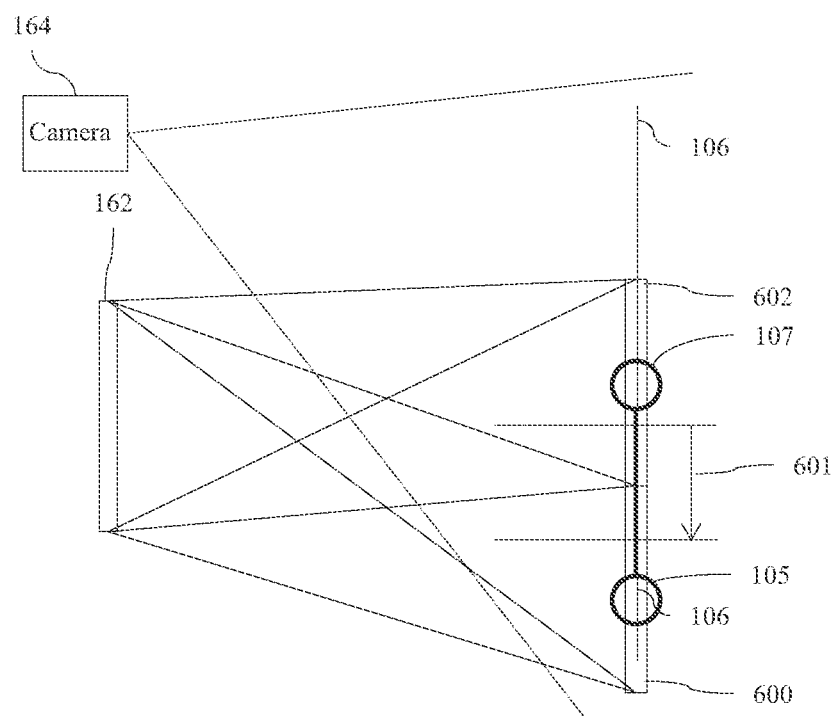

FIGS. 6A-B are schematic diagrams illustrating top views of an autostereoscopic display device 162 using observer tracking that may optionally be implemented in the destination telecommunication device 160. FIG. 6A illustrates the case of a first observer location. Eyes 105, 107 of the destination observer 104 are located in viewing windows 600, 602 that are located at a window plane 106 located at a nominal viewing distance 464 from the display device 162. If an observer's eye is within a viewing window then a single image is seen across the whole of the autostereoscopic display device 162. If the observer' eyes move out of the viewing window, no autostereoscopic image or an incorrect image is seen. To achieve enhanced viewing freedom, an observer tracking system may be arranged making use of at least one camera 164 of the destination telecommunication device 160. Thus for a movement 601 of the observer, the viewing windows may be adjusted in lateral position to correctly align the viewing windows 600, 602 with the observer's eyes 105, 107 respectively.

It is possible to use data from the observer tracking system to provide information on detecting the eye-line in face detection step 200.

Figure 7A:
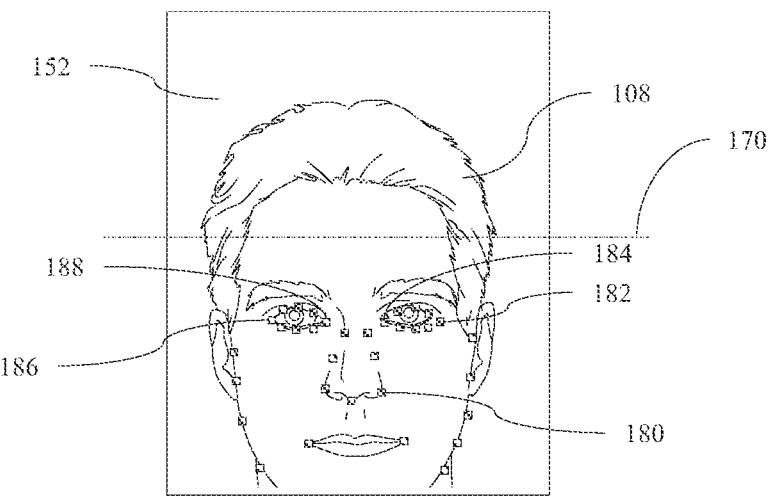
FIGS. 7A-C are schematic diagrams illustrating collection of feature data in a return image and the vertical correction of gaze in return image, in accordance with the present disclosure.

FIG. 7A is a schematic diagram illustrating an example of the collection of data representing detected features in the face detection step 200 from a return image 108 displayed on the display device 152 of the source telecommunication device 150. In operation of the autostereoscopic display device 152 in the destination telecommunication device 160, it may be typically desirable to provide a face detector to adjust the direction of optical windows. Such face detector may typically provide feature points 180 representing the locations of features using known computer vision techniques such as Active Shape Models (ASM) or Active Appearance Models (AAM) and described in "Active shape models—their training and application", T. F. Cootes et al., Computer Vision and Image Understanding, 61(1):38-59, January 1995 and "Active appearance models", T. F. Cootes et al., IEEE Trans. Pattern Analysis and Machine Intelligence, 23(6):681-685, 2001 and incorporated herein by reference. Feature points 180 may describe particular locations on a face such as the outline of eyes and noses; for the present embodiments, establishing the location of features on eyes is particularly desirable. In the observer tracking arrangements of FIGS. 6A-6B, the location of the position between the observer's eyes may be used to determine the output direction of the viewing windows in correspondence to observer position.

Figure 7B:
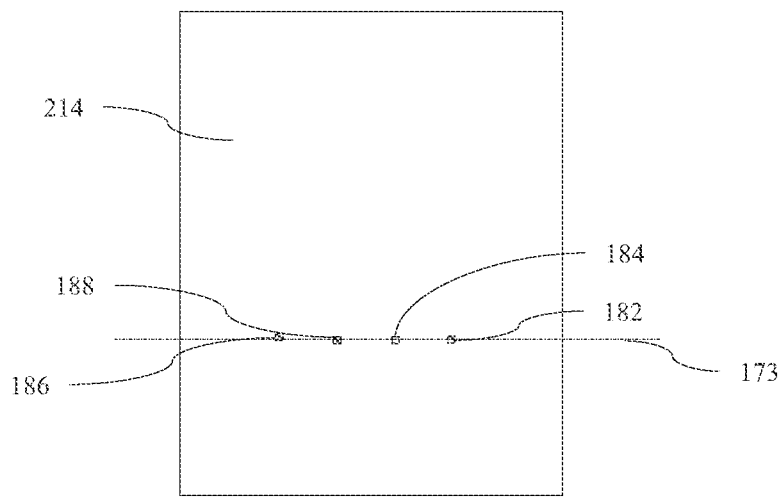
Figure 7C:
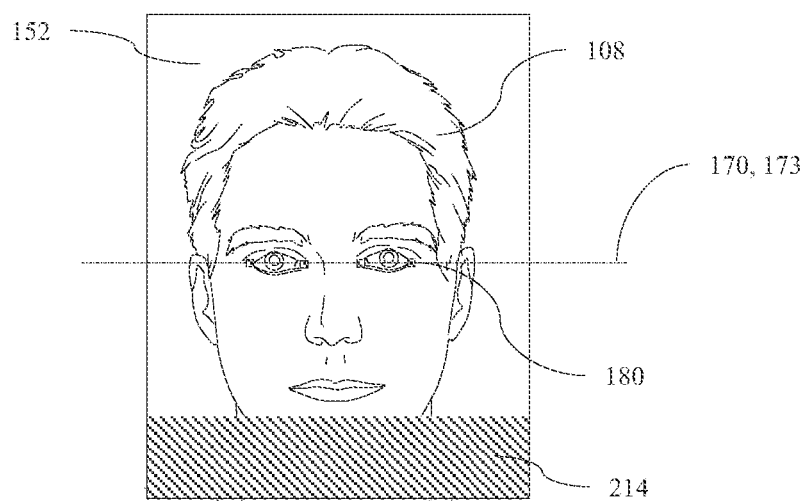

FIGS. 7B-7C are schematic diagrams illustrating vertical gaze correction of a return image 108 on a display device 152 of a source telecommunication device 150. As shown in FIG. 7B, the locations of inner and outer edges of left eye 182, 184 respectively and right eye 186, 188 respectively can advantageously be used to provide the nominal pupil positions for tracked illumination of an observer in an autostereoscopic display device and may further be used to determine the position of the eye-line 173 of the source observer 100 within the delivery image 120. The data on the location of the eye-line 173 may thus advantageously be determined at low additional processor cost over that required for tracked autostereoscopic display device, and may be transmitted with the image data from the destination telecommunication device. Thus detecting a face in the return images 108 may include detecting features of a face including eye features, with the eye-line 173 of the detected face being defined relative to the detected eye features.

On receipt at the source telecommunication device 150 of the return images 108, the location of the eye-line 173 can be used to provide vertical correction without further face detection being required as shown in FIG. 7C. Alternatively, feature points may be located on a server in the telecommunication network 199 or on the source telecommunication device 150 as described further below. Further, the return image 108 may not include a lower region, for example showing the torso and/or chin, in which case a blanking area 214 may be inserted in the that region.

Figure 8A:
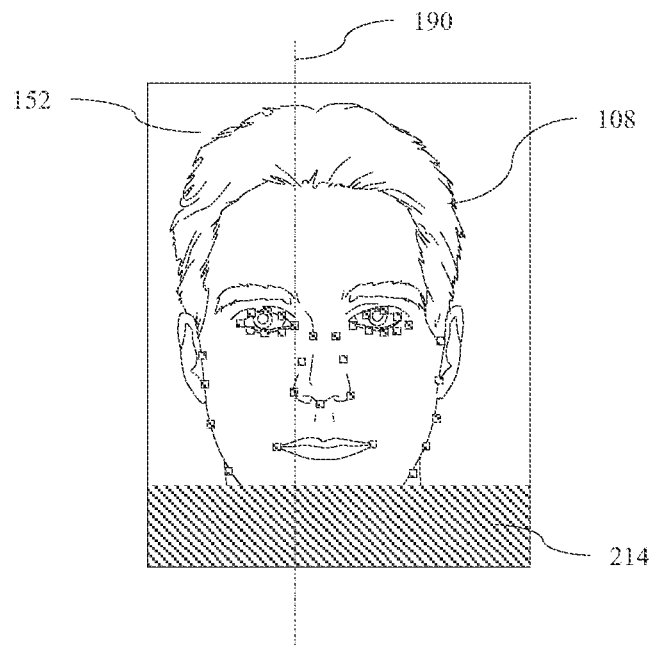
FIGS. 8A-B are schematic diagrams illustrating the horizontal correction of gaze in a return image, in accordance with the present disclosure.
Figure 8B:
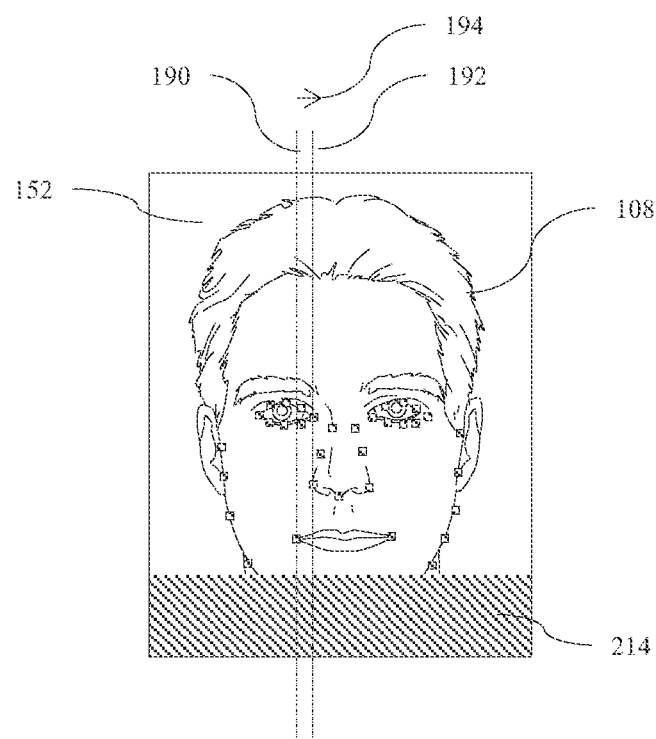

FIGS. 8A-8B are schematic diagrams illustrating horizontal gaze correction of a return image 108 on a display device 152 of a source telecommunication device 150. Feature points may also be used to provide horizontal gaze correction. For example, during autostereoscopic teleconferencing it may be desirable to place the observer's eyes at the screen plane, minimizing degradation of the eye appearance from residual cross talk in an autostereoscopic display device 152.

Face detectors may be arranged to locate the eye positions for left and right images, and a lateral position correction applied to one of the images to set the eyes with zero disparity. Thus in a right eye image, the line 190 of the feature point 188 may be offset by a distance 194 to the left of the line 192 of the feature point 188 for the right eye image. As described above, the method may therefore include shifting the return images 108 horizontally to position the center line of the detected face centrally upon display of the shifted return images on the display device of the source telecommunication device in the predetermined orientation.

Advantageously the quality of eye-to-eye contact can be increased by reducing the appearance of cross talk and the depth can be scaled around the eye location, that may be substantially aligned to the Glabella.

Above there is described an example in which steps 200, 201 of the image processing are performed in the destination telecommunication device 160 and steps 204-206 of the image processing are performed in the source telecommunication device 150. However, this is not essential and in general the image processing may be performed in any device or any combination of devices of the telecommunication system through which the return images pass. Some non-limiting examples are now given with reference to FIGS. 9-11 which are schematic diagrams illustrating communication between source and destination telecommunication devices 150 and 160 arranged to achieve correction of the position of delivery and return images. In particular FIGS. 9-11 show examples in which the methods are applied bi-directionally to the return images 108 and the delivery images 120, and the location in which the return images 108 and the delivery images 120 are processed is symmetrical.

Figure 9:
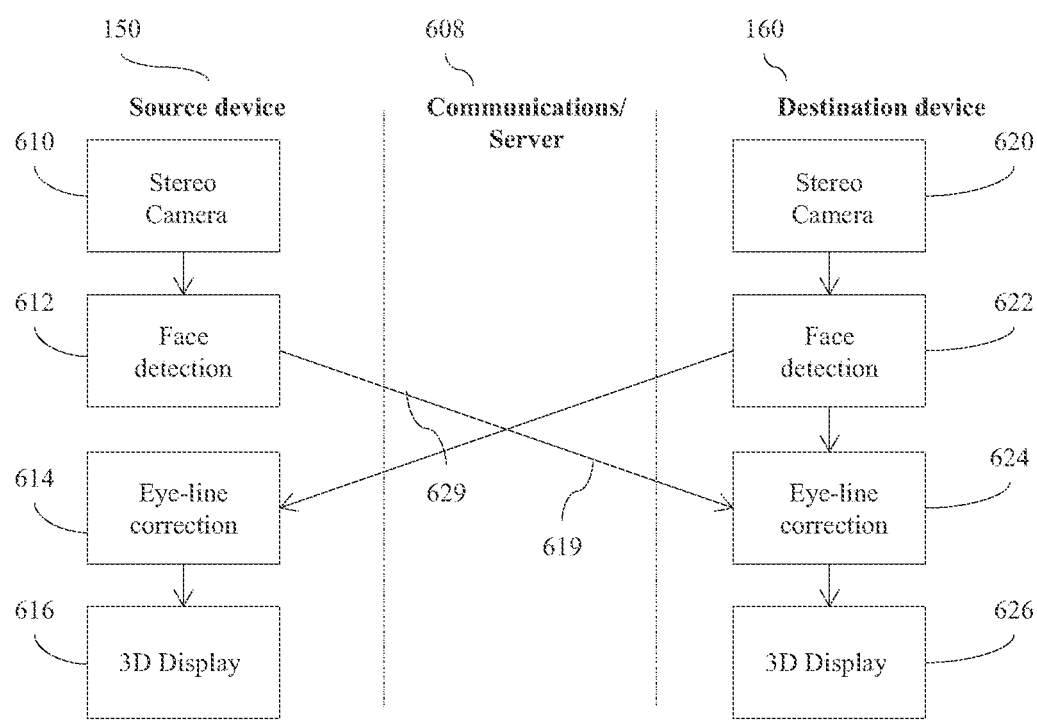
FIGS. 9-13 are schematic diagrams illustrating means of communication between source and destination devices arranged to achieve correction of the position of delivery and return images, in accordance with the present disclosure.

In FIG. 9, a stereoscopic pair of cameras 610, a face detector 612, an eye-line corrector 614 and an autostereoscopic display device 616 of source telecommunication device 150 are arranged to cooperate with a stereoscopic pair of cameras camera 620, a face detector 622, an eye-line corrector 624 and an autostereoscopic display device 626 of destination telecommunication device 160. In this example, the processing of return images 108 is performed in the same devices as shown in FIG. 5 and described above.

As described above, the face detectors 612 and 622 may be arranged as part of the tracking system for the autostereoscopic display devices 616 and 626, delivering detected face data 619 and 629 between the source device 150 and the destination device 160. Thus for the return images 108, the steps of detecting faces is performed in the destination telecommunication device 160 and the step of shifting the return image is performed in the source telecommunication device 150 and vice versa for the delivery images 120. Thus a single face tracker can advantageously achieve detection for observer tracking and teleconferencing uses, reducing cost and power consumption in the destination device 160 and not significantly affecting the performance of the source device 150.

Figure 10:
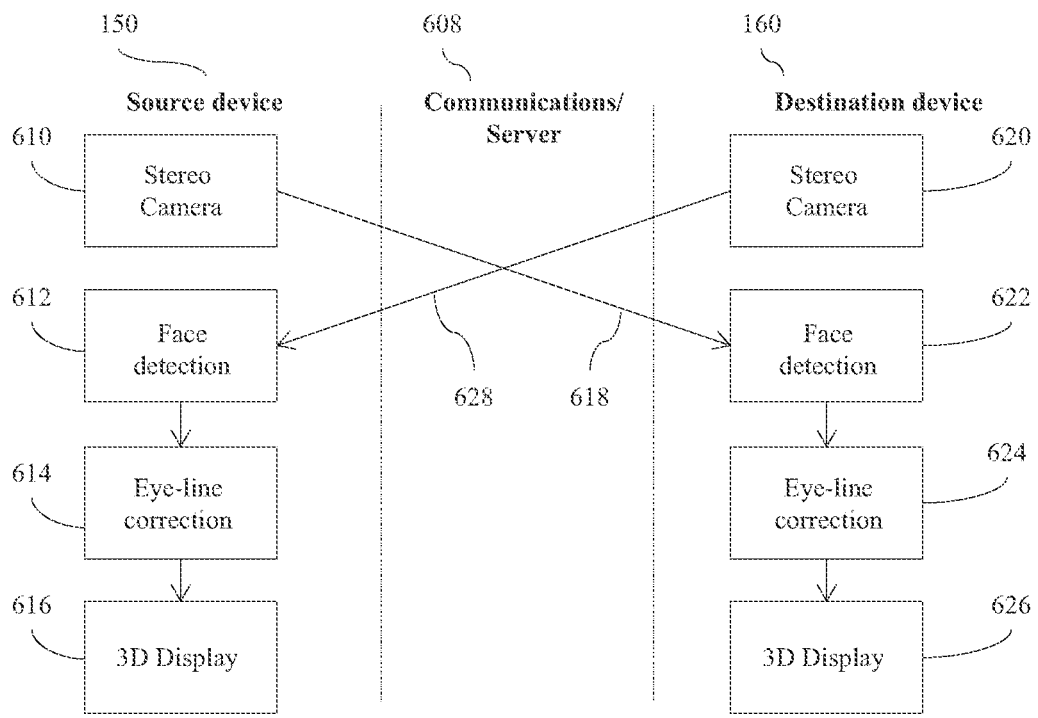
Figure 11:
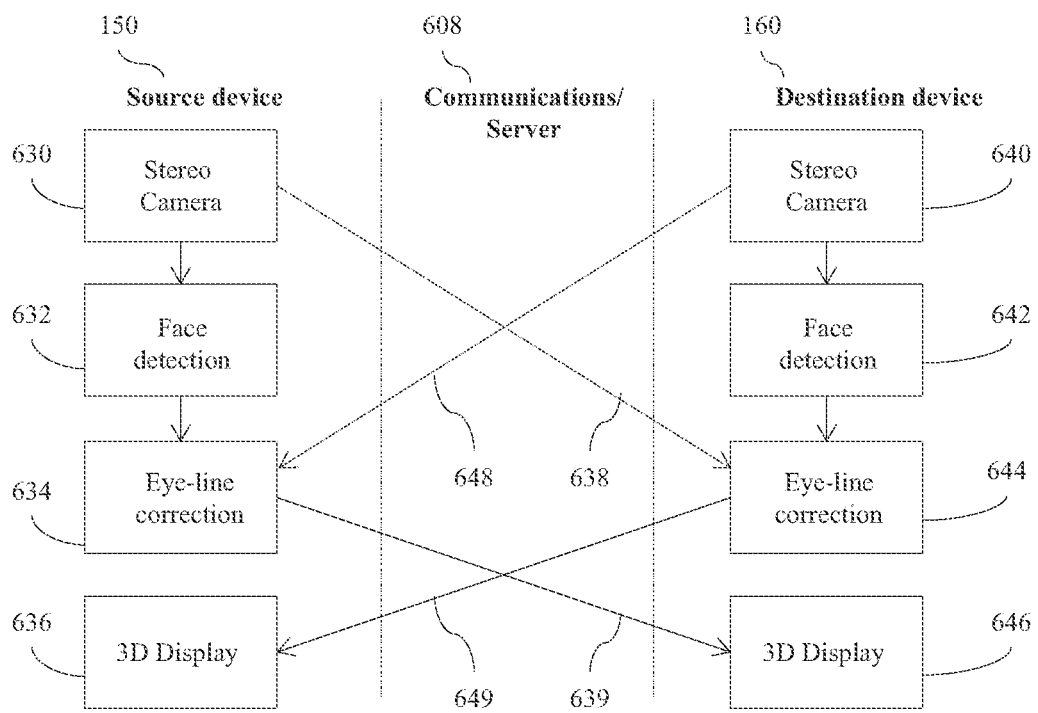

In FIG. 10, the same components are present as in FIG. 9, but the face detection may be achieved by passing unprocessed return images 628 from the destination device 160 to the source device 150 delivery images 618 to the destination device 160 from the source device 150, so that the detection and correction of face position is performed after transmission of the return images 628 and delivery images 618. Thus the steps of detecting faces and shifting the return images 628 is performed in the source telecommunication device 150 and the steps of detecting faces and shifting the delivery images 628 is performed in the destination telecommunication device 160. Advantageously, in telecommunication devices with unmatched processor capability, the destination telecommunication device 160 may be able to run a more accurate and robust face detector than the source telecommunication device 150, increasing performance for the system and enabling increased naturalness of interaction.

In FIG. 11, the same components are present as in FIG. 9, but the face detection and image correction of the return image is provided in the destination telecommunication device 160 and the face detection and image correction of the delivery image is provided in the source telecommunication device 150, so that the corrected images 639, 649 are communicated after the shifting. Knowledge of the position of the cameras in the source telecommunication device 150 and destination telecommunication device 160 may be communicated by means of data 638, 648. Advantageously, such a process can send images to devices in which the reliability of eye-line detection is low or no eye-line correction is incorporated in one of the source or destination devices.

Such a process may be further desirable for use in hybrid systems optimizing the performance by using mixtures of the methods in FIGS. 9-11 to reflect different processing capability of source and destination devices.

Figure 12:
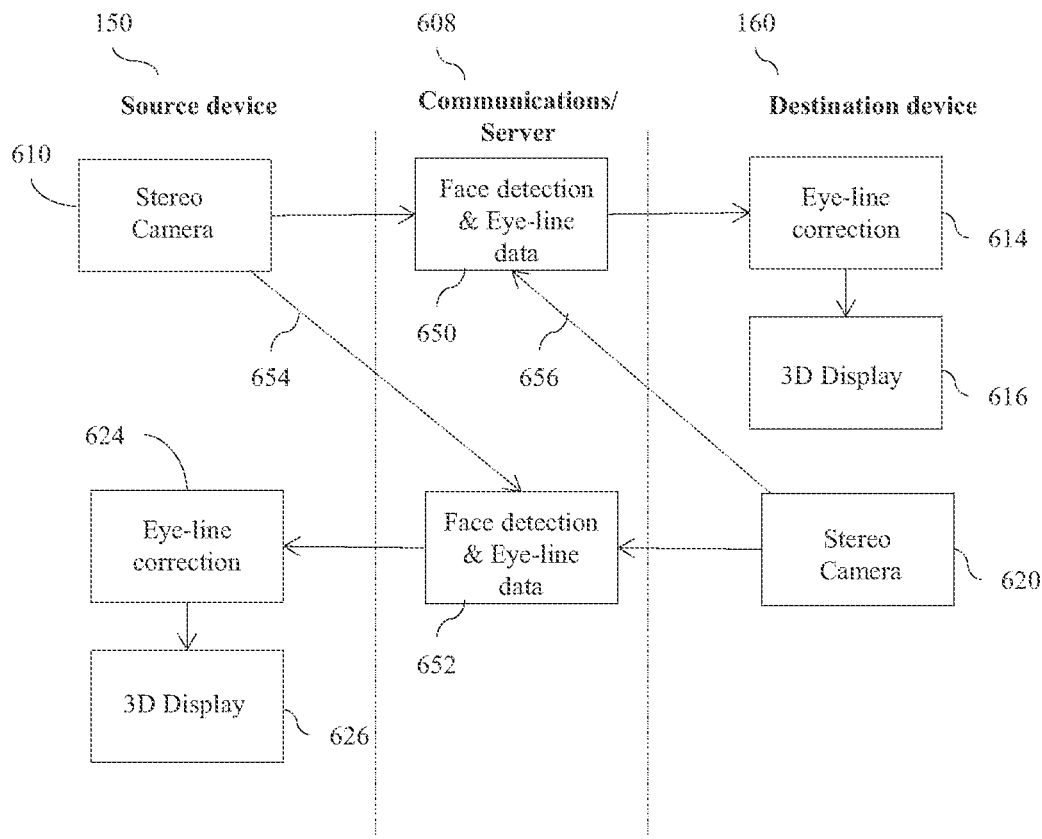
Figure 13:
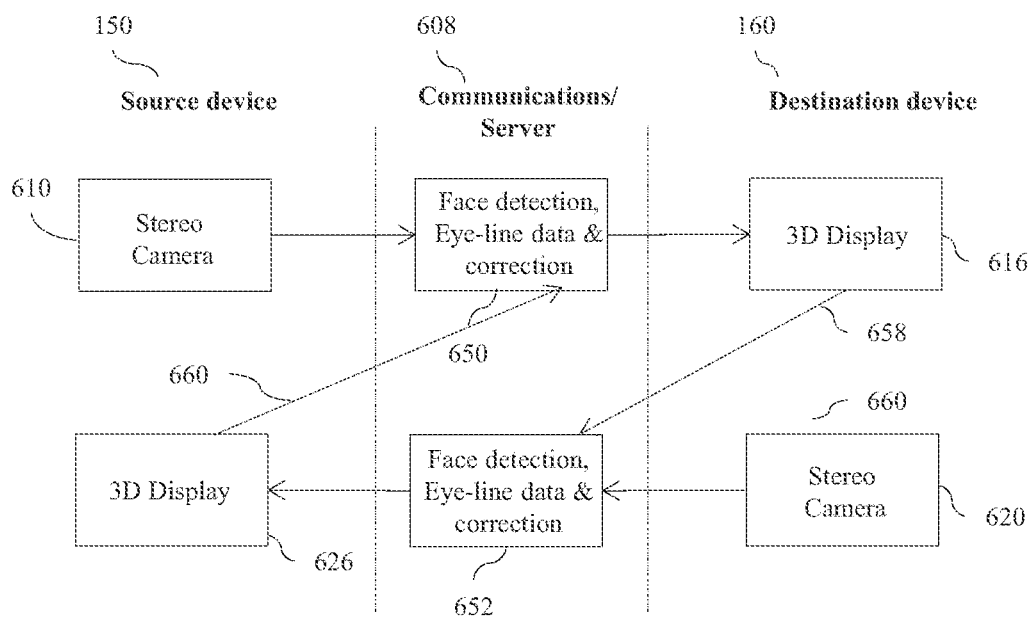

Alternatively, some or all of the processing may be performed in a server in the telecommunication network 199 through which the images are transmitted. Some non-limitative examples of this are shown in FIGS. 12-13 which are further schematic diagrams illustrating communication between source and destination telecommunication devices 150 and 160 through a communications server 608 in the telecommunication network 199 arranged to achieve correction of the position of delivery and return images. The communications server 608 may be located at a remote location to either or both the source and destination telecommunication devices 150 and 160. In these embodiments the communications server 608 is arranged to perform the face detection operations for delivery and return images in processing sections 650, 652 implemented in the communications server 608 with data 654, 656 transmitted to face detection modules determining camera line 170 location in source and destination devices respectively.

The step of shifting the images may be performed in eye-line correctors 624, 614 of the source and destination telecommunication devices 150 and 160 as shown in FIG. 12, or in the processing sections 650, 652 of the communications server 608 as shown in FIG. 13. In the latter case, data 658, 660 may be provided to the processing sections 650, 652 respectively to determine display location with respect to stereo camera line 170. Advantageously, the cost and complexity of the telecommunications devices may be reduced.

It has been appreciated that to optimize the quality of human social interaction in a telecommunications system in which images are displayed an autostereoscopically, it is possible to minimize distortion of head shape due to the geometry of the delivery image capture and replay environments. In particular, it is desirable to achieve roundness of reproduction, that is the ratio between lateral and longitudinal magnification is approximately 1:1 in the region of viewing interest. This may be achieved as follows.

Figure 14:
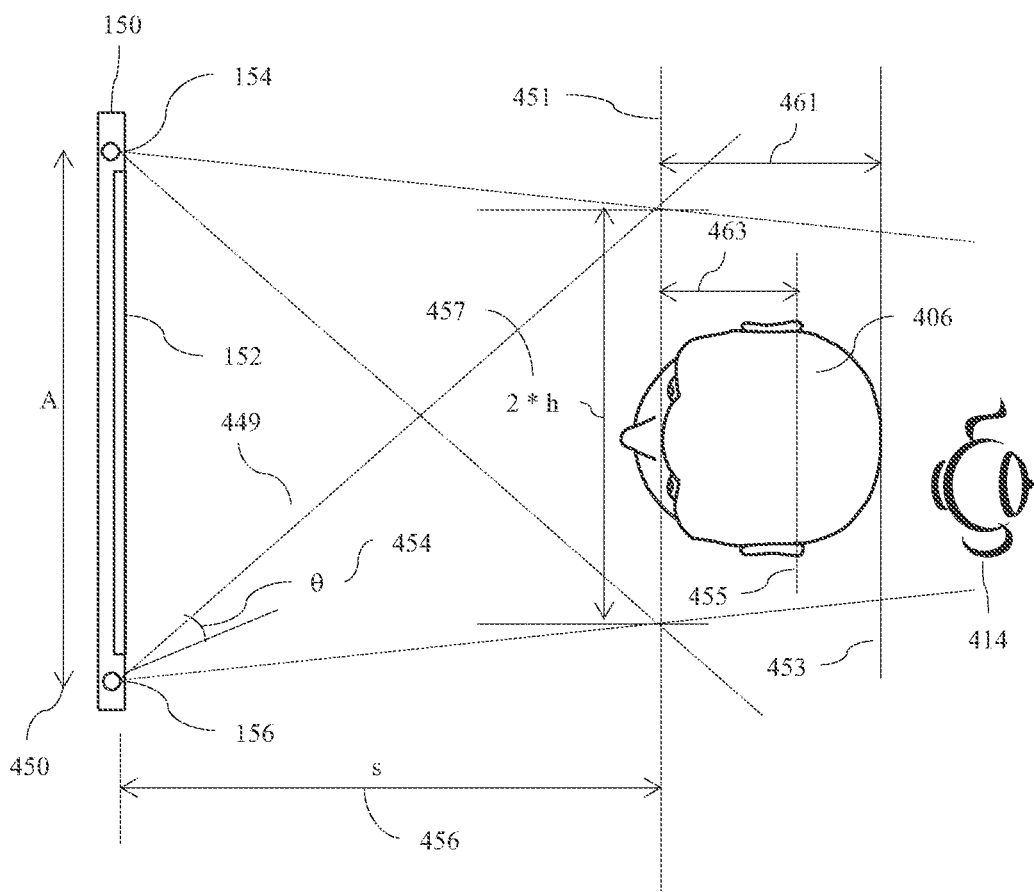
FIG. 14 is a schematic diagram illustrating the top view of the capture conditions of an observer in a stereoscopic camera of a source device, in accordance with the present disclosure.

FIG. 14 is a schematic diagram illustrating the top view of the capture conditions of an observer 406 by a stereoscopic pair of cameras 154, 156 of a source telecommunication device 1150. The source telecommunication device 150 includes the stereoscopic pair of cameras 154, 156 with separation 450 of length A and an autostereoscopic display device 152. The cameras 154, 156 are arranged to capture the stereo delivery images (which may comprise left and right images) of a source observer 406 located in front of a background 414.

The cameras 154, 156 have substantially the same lateral cone half-angle 454 of capture of size θ. The capture half-angle 454 is half the lateral angle of the field of view of the cameras 154, 156. The source observer 406 may be arranged at a nominal distance 456 of length s from the autostereoscopic display device 152, which may be for example the window plane 106 as described in FIG. 6A.

Typical parameters for optical systems of autostereoscopic display devices and for relevant physiological characteristics of human observers are as follows. Typically the optical system of autostereoscopic display devices are designed, taking into account typical physiological characteristics of human observers, to achieve a window plane 106 at a distance 456 that is the most comfortable viewing distance for the majority of viewing population.

The window plane of an autostereoscopic display is the distance at which respective light sources of the autostereoscopic display are imaged for substantially all points across the width of the display. Thus an observer with an eye in the image of a light source, termed the optical window, sees the same image across the whole width of the display. The light sources may be formed from an array of pixels of a spatial light modulator in a spatially multiplexed display such as a lenticular or parallax barrier display; or may be individual light emitting elements in a temporally multiplexed display. The optical system of the autostereoscopic system (such as the lenticular screen, parallax barrier or optical valve) is arranged so that light sources are imaged from the center of the display in a first direction and light sources are imaged from points away from the center of the display in different controlled directions. The images from each point of the display overlap such that optical windows are formed at the intersection of said directions from points across the width of the display. The distance between the display and the optical windows is the nominal viewing distance of the display.

For example, the window plane of mobile devices of display diagonal size in the range 3-10" may be arranged at 300 mm for most adult observers, although may be 200-250 mm for children. For larger display devices such as for laptop or monitor display devices of display diagonals in the range 15-24", the optimum viewing distance may be increased to 400-700 mm. The window distance can thus be considered the optimum capture distance and replay distance of the respective display system.

The region of interest for providing roundness of replayed images will now be considered. This may include but is not limited to the regions between the front of the nose and eyes, front of nose and ears or Glabella and rear of head. In the human population, the distance 461 may be defined as the distance of the plane 451 of the Glabella to the plane 453 of the back of the head and may be 20 cm for the $50^{th}$ percentile in men and 19 cm for the $50^{th}$ percentile in women. Ignoring small children, the bounds of distance may be considered approximately 17 cm to 22 cm. The distance 463 from the plane 451 of the Glabella to the plane 453 of the rearmost visible part of the head may thus be considered to be approximately 10 cm and may be bounded by a few cm either side across the human population.

The typical eye separation 460 of size E for the human population may be 62 mm, with a typical maximum of 68 mm for large adults and a typical minimum of 55 mm for small children.

In typical front facing cameras for cell phone and tablet applications, the angular field of view may be set to be +/−20°. This can achieve a width of view h of size h of +/−110 mm at a 300 mm nominal viewing distance. As display size varies it may be desirable to fix the angular field of view of the cameras 154, 156, or it may be desirable to fix the lateral width of view.

Figure 15:
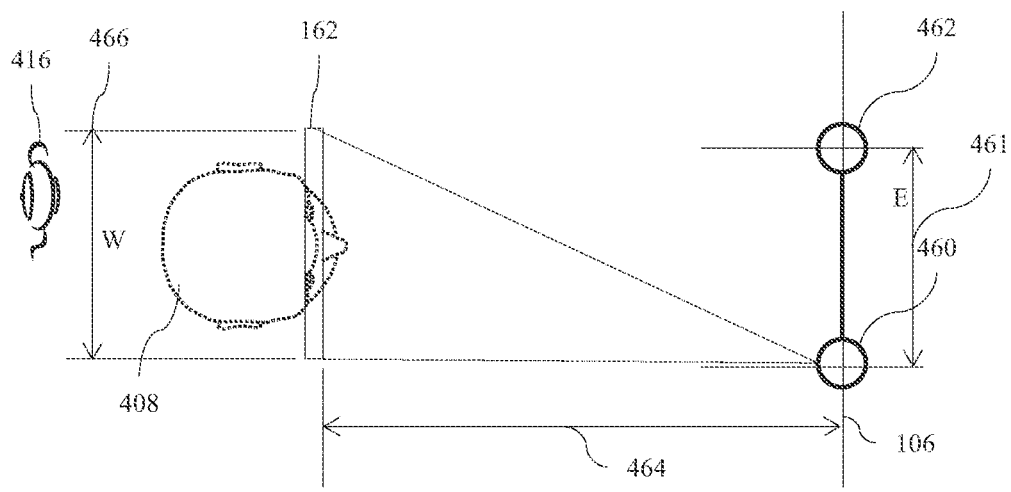
FIG. 15 is a schematic diagram illustrating the top view of the image replay conditions of the captured observer in an autostereoscopic display of a destination device, in accordance with the present disclosure.

FIG. 15 is a schematic diagram illustrating the top view of the image replay conditions of the image 408 of the source observer 406 and the image 416 of the background 414 in an autostereoscopic display device of a destination device. Thus a destination observer with left eye 460 and right eye 462 with separation 461 of size E may be arranged at distance 464 that is nominally the same as distance 456, being of length s. The destination observer may observe the destination autostereoscopic display device 162 with width 466, perceiving the autostereoscopic image 408 of the source observer 406 and image 416 of the background 414.

In operation as telecommunications devices, and in particular mobile telecommunications devices, both the source and destination telecommunication devices 150 and 160 may be typically arranged to have substantially the same camera separation 450 of size A which is slightly larger than the display width, W. In an illustrative example, the camera separation may be considered to be an oversize factor δ that may be 5% so that the camera separation is 105% of the display width. The oversize parameter arises from the finite width of the bezel of the optical system comprising the edges of the spatial light modulator of a display system and the width of the respective autostereoscopic optical components. Thus, the size A and width W are similar with size A being slightly larger than width W. In an illustrative embodiment a display of diagonal 5" and aspect ratio 4:3 arranged in portrait orientation may have a display aperture width W of 3". The bezel width may be 2 mm on each side and each camera may have a body width of 2 mm with a centrally aligned camera aperture in the camera body. The camera separation may thus be 82 mm, and the oversize parameter, δ may be 0.07. Either the size A or width W may be considered in the following discussion.

Given the wide range of viewing parameters in the display device 162, the surprising result has been found that the range of useful lateral camera separations that achieve acceptable levels of roundness for head reproduction is somewhat limited. The effect of distortion of the geometry of head reproduction will now be described.

Figure 16:
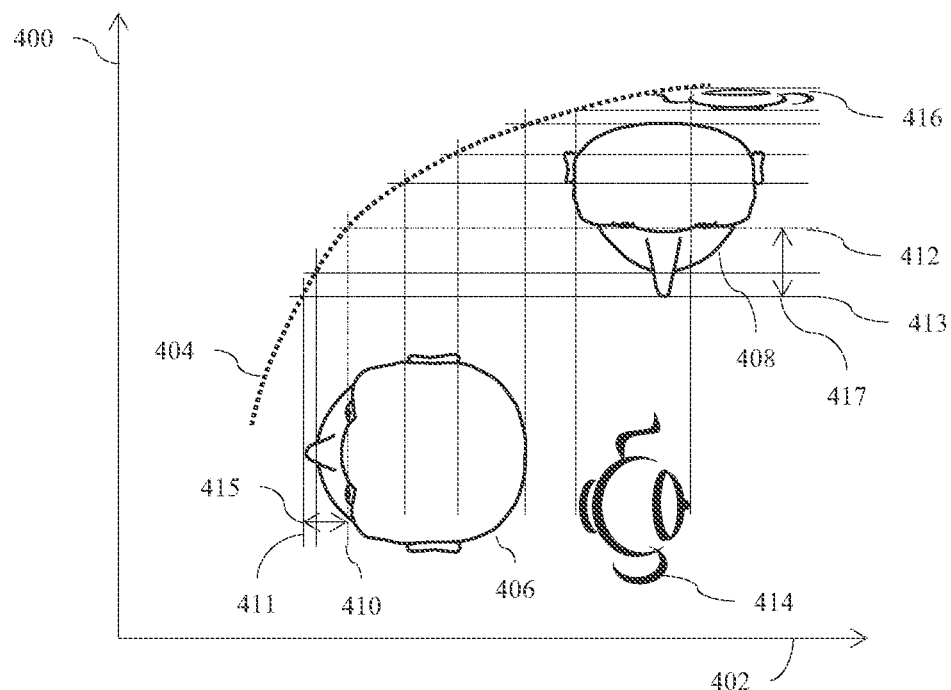
FIG. 16 is a graph of perceived stereoscopic depth against actual depth for a stereoscopic capture and display telecommunications system comprising uncorrected camera geometry and image background, in accordance with the present disclosure.

FIG. 16 is a graph of perceived stereoscopic depth against actual depth for a typical stereoscopic capture and display telecommunication system comprising uncorrected camera geometry and image background. The perceived stereoscopic depth 400 is mapped against the actual depth 402 for the observer 406 and background 414. The geometry of the capture of the delivery image at the source telecommunication device 150 and display at the destination telecommunication device 160 may determine a transfer function 404, such that the image 406 and background 414 may undergo some substantial distortion artifacts on display as images 408 and 416. The plane 410 of the Glabella of the source observer 406 is thus mapped to plane 412 while the plane of the tip of the observer's nose 411 is mapped to plane 413. Thus distance 417 may be substantially greater than the distance 415. Thus a Pinocchio effect may arise to grow the perceived length of the observer's nose in an unnatural manner. Such artifacts are clearly visible in use as the human visual system has evolved high sensitivity to any unusual appearance of other human faces and are thus typically unacceptable in use.

Figure 17:
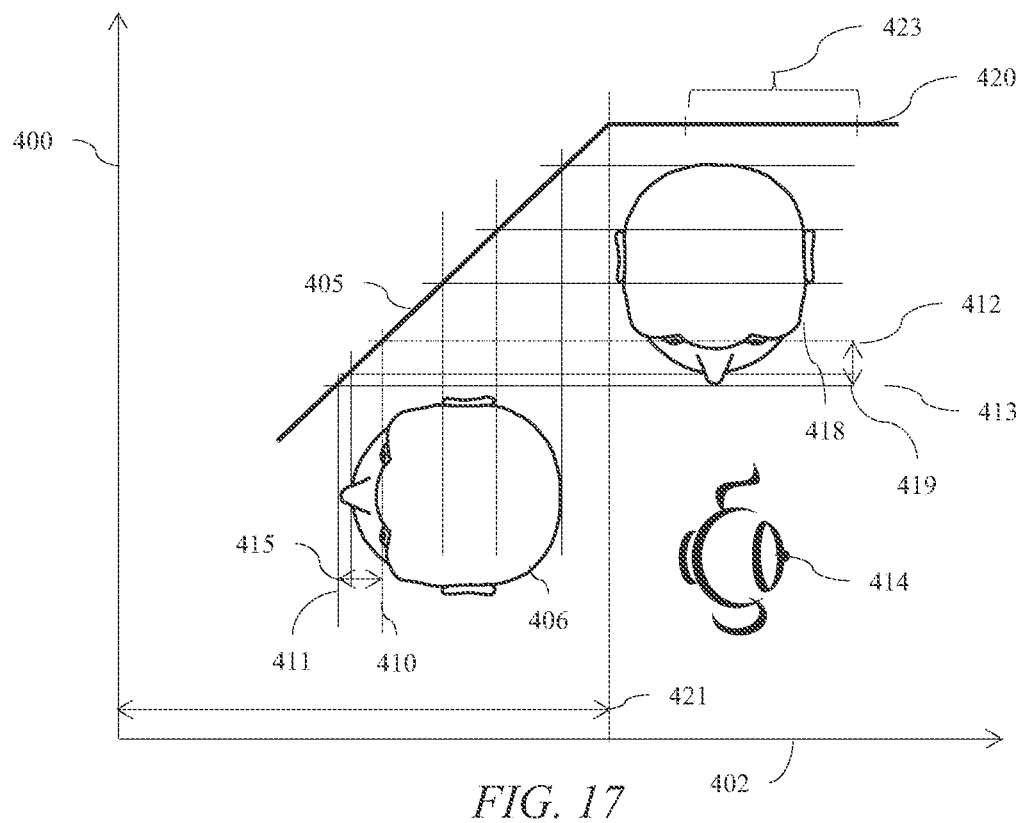
FIG. 17 is a graph of perceived stereoscopic depth against actual depth for a stereoscopic capture and display telecommunications system arranged to achieve perceived head roundness and corrected image background, in accordance with the present disclosure.

FIG. 17 is a graph of perceived stereoscopic depth against actual depth for a stereoscopic capture and display telecommunications system arranged to achieve perceived head roundness and corrected image background. As will be described, the geometry of the capture of the delivery image at the source device and replay at the destination device may arranged to achieve a transfer function 405 that is substantially linear in the region of the observer's head 406, and thus the ratio of head width to length can be preserved, achieving roundness.

Thus, the distance 415 may be mapped to distance 419 that is in proportion to the size of the replayed observer's head 418. In this manner the roundness of the observer's head on the destination device can be made substantially with correct roundness, scaled with the replayed observer's head size.

At greater distances than a distance 421, a flat and linear transfer function 420 may be arranged as will be described below, so that background objects are mapped to a single 2D plane.

It has been appreciated that the range of camera separations 450 of size A for autostereoscopic telecommunication devices are surprisingly restricted in order to achieve the face roundness transfer function 405 as indicated in FIG. 17, as will now be described.

The desired camera separation 450 of size A to achieve roundness of the image of the head on the destination display device 162 may be given by $$A = \frac{E \cdot s \cdot (s + \alpha) * \tan\theta}{s^2 * \tan\theta + \alpha \cdot W/2} \qquad \text{eqn. 1}$$

where E is the eye separation 461 of the destination observer, s is the viewing distance 464 of the destination observer, α is the depth 461 of the head of the source observer 460 as shown in FIG. 14, θ is the lateral capture half-angle 454 of the cameras 154, 156 of the source telecommunication device 150 and W is the width 466 of the display device 162. In the case of an autostereoscopic display device, the width W and separation A may be considered to be substantially the same for the source and destination telecommunication devices 150 and 160.

Due to the mechanical constraints of mobile display devices, stereoscopic cameras that are arranged to provide correct gaze may be set just outside the width 466 of the display device. Further the nominal viewing distance 464 for the display device 162 of the destination telecommunication device 160 is typically arranged to be the same length s as for the display device 152 of the source telecommunication device 150. Setting $$A = W*(1+\delta) \qquad \text{eqn.2}$$

and solving for W in eqn. 1, the relationship between display width W (and thus camera separation A) can be derived for a range of viewing distances, camera capture half-angles and typical human physiological properties.

Figure 18:
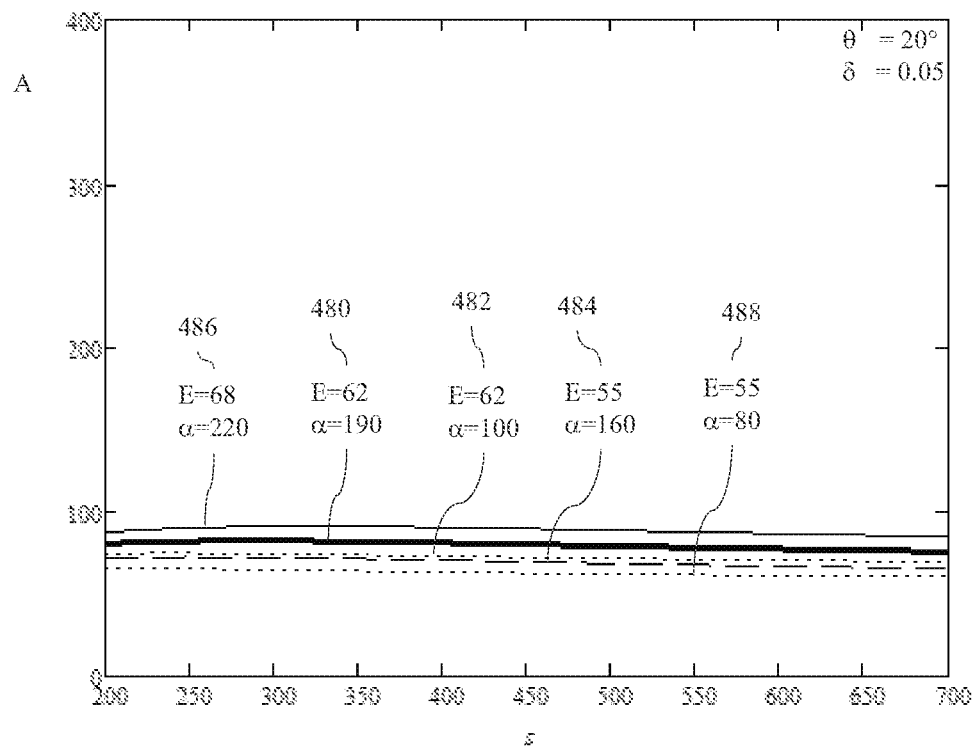
FIGS. 18-19 are graphs of camera separation against destination observer viewing distance for an autostereoscopic telecommunications system arranged to achieve perceived head roundness, in accordance with the present disclosure.
Figure 19:
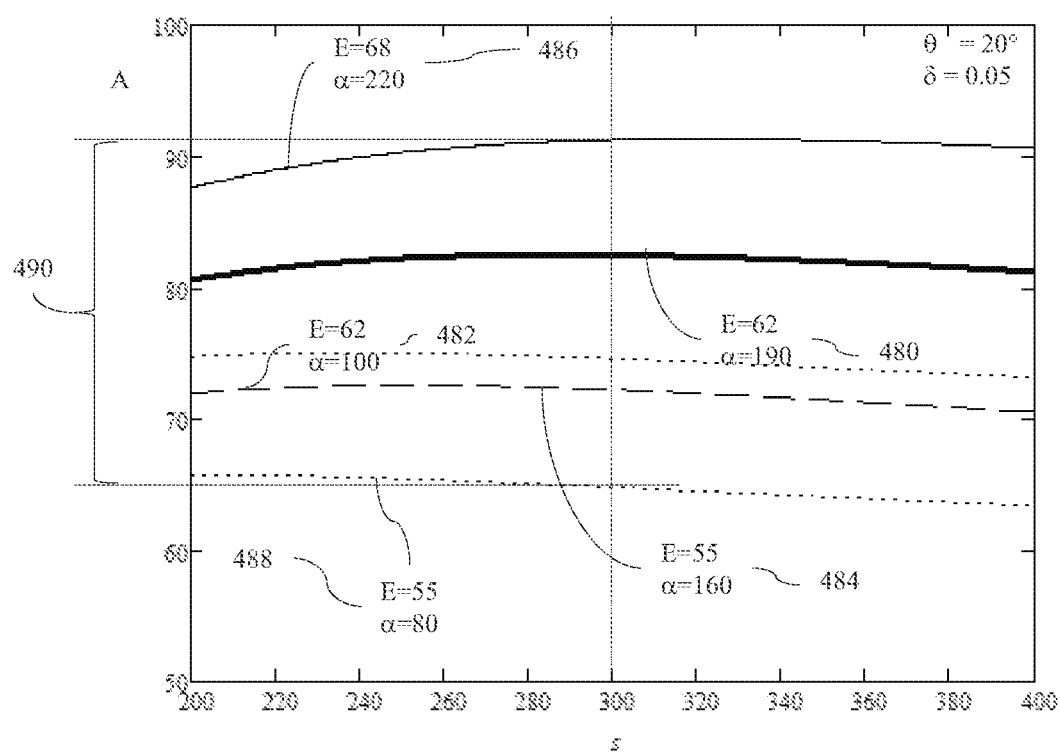

FIGS. 18-19 are schematic graphs at different scales of the size A of the camera separation 450 against the length s of the viewing distance 464 for an autostereoscopic electronics device arranged to achieve perceived head roundness for a given size θ of the capture half-angle 454, in this case of 20° which is a typical value. Specific values of the relevant parameters of the size E of the eye separation 461 of the destination observer and the size α of the depth 461 of the head of the source observer 406, spread across the typical ranges for those parameters in the human population as discussed above, are selected and the respective curves for those specific values are plotted.

The size A of the camera separation 450 in FIG. 18 is varied in the range up to approximately 17" display diagonal, while the range of viewing distances is adjusted between typical maximum and minimum values for such range of display sizes. The size θ of the capture half-angle 454 is set as 20° and the camera separation to display width oversize factor δ is set to a typical value of 5%. Curves 480, 482, 484, 486, 488 are arranged with different settings of observer eye spacing E in the range 55-58 mm and preferred compensation region depth α in the range 80-220 mm.

The curves therefore illustrate how the size A of the camera separation 450 that achieves perceived head roundness varies with the length s of the viewing distance 464. As can be seen from FIG. 18, the curves are surprisingly tightly grouped for across the typical range of parameters in the human population and across a wide range of values of the distance s of the nominal viewing distance 464 for the display device 162. For example, for a nominal eye separation 461 of 62 mm and observer head depth 461 of 190 mm, then for a viewing distance 464 of 300 mm, a round face is achieved for size A of the camera separation 450 of approximately 83 mm, corresponding to a display width W 466 of 79 mm. The other curves show close grouping around that the size A of the camera separation 450. For a viewing distance 464 of 300 mm, all the curves show the size A of the separation 450 of the cameras 154, 156 in the stereoscopic display device in a range f with a lower limit of 60 mm and an upper limit of 95 mm. At other values of the viewing distance 464, the separation 450 of the cameras is only slightly larger.

Thus display devices with widths substantially greater than the present surprising ranges may not be able to accurately reproduce face roundness for uncorrected images. However, such ranges are well suited to mobile display platforms.

Figure 20A:
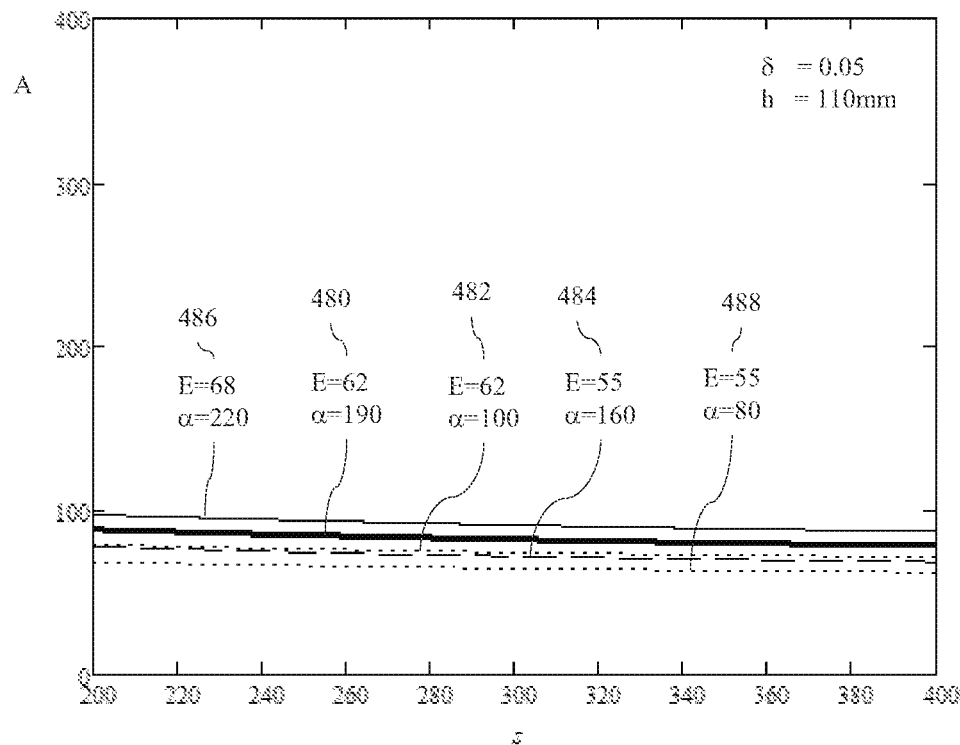
FIGS. 20A-20B are graphs of camera separation against destination observer viewing distance for an autostereoscopic telecommunications system arranged to achieve perceived head roundness, in accordance with the present disclosure.
Figure 20B:
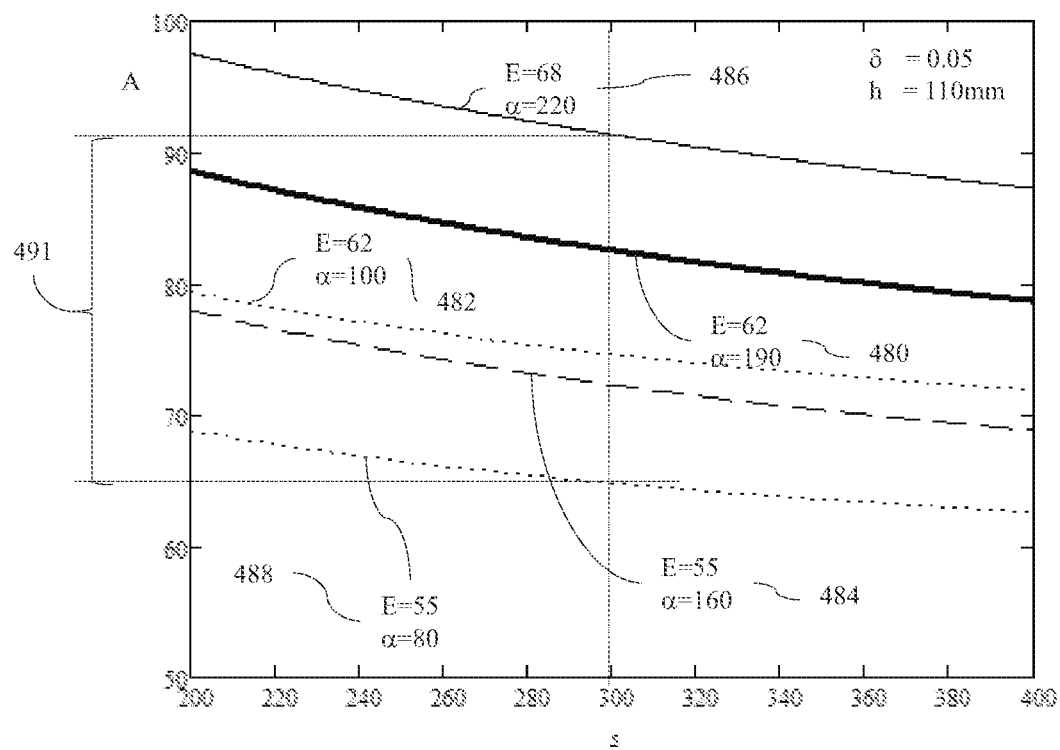

FIGS. 20A-20B are graphs at different scales of the size A of the camera separation 450 against the length s of the viewing distance 464 for an autostereoscopic telecommunications system arranged to achieve perceived head roundness for a given size h of the width of view so that the size θ of the camera half-angle 454 varies with the length s of the nominal viewing distance 464. Again, specific values of the relevant parameters of the size E of the eye separation 461 of the destination observer and the size a of the depth 461 of the head of the source observer 406, spread across the typical ranges for those parameters in the human population as discussed above, are selected and the respective curves for those specific values are plotted.

The curves therefore again illustrate how the size A of the camera separation 450 that achieves perceived head roundness varies with the length s of the viewing distance 464. The range of useful sizes A of the camera separations 450 remains surprisingly small and similar to the arrangement of FIGS. 18-19. For example, for a viewing distance 464 of 300 mm, all the curves show the size A of the separation 450 of the cameras 154, 156 in the stereoscopic display device in a range 491 with a lower limit of 65 mm and an upper limit of 95 mm, with a slight increase in the separation 450 of the cameras at other values of the viewing distance 464.

Figure 21A:
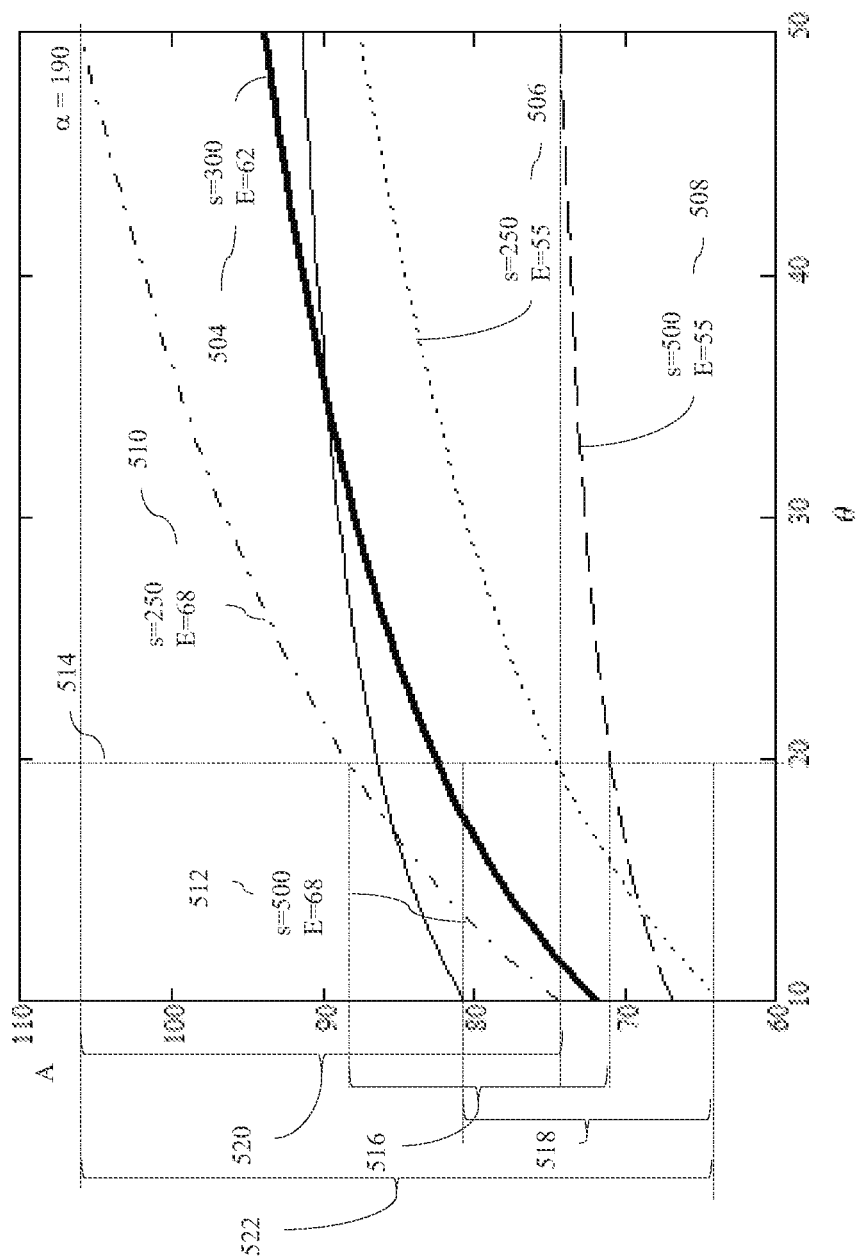
FIGS. 21A-21B are graphs of camera separation against camera angular field of view for an autostereoscopic telecommunications system arranged to achieve perceived head roundness, in accordance with the present disclosure.

FIG. 21A is a graph of the size A of the camera separation 450 against size θ of the capture half-angle 454 for an autostereoscopic telecommunications system arranged to achieve perceived head roundness, for a given size a of the depth 461 of the head of the source observer 406, in this case of 190 mm which is a typical value. Specific values of the relevant parameters of the size E of the eye separation 461 of the destination observer and the length s of the viewing distance 464, spread across the typical ranges for those parameters in the human population as discussed above, are selected and the respective curves for those specific values are plotted.

The curves therefore illustrate how the size A of the camera separation 450 that achieves perceived head roundness varies with the size θ of the capture half-angle 454. Again, the curves are surprisingly tightly grouped for across the typical range of parameters in the human population and across a wide range of values of the size θ of the capture half-angle 454. The curves show similar values of the size A of the camera separation 450, although there is slightly wider variation than with the distance s of the nominal viewing distance 464 for the display device 162. In particular, the curves 502, 504, 506, 508, 510, 512 show the size A of the separation 450 of the cameras 154, 156 in the stereoscopic display device in: a range 516 with a lower limit of 70 mm and an upper limit of 90 mm for a capture half-angle 454 of size θ of 20°, a range 518 with a lower limit of 60 mm and an upper limit of 85 mm for a capture half-angle 454 of size θ of 10°, a range 520 with a lower limit of 70 mm and an upper limit of 110 mm for a capture half-angle 454 of size θ of 50°, and an overall range 522 with a lower limit of 60 mm and an upper limit of 110 mm.

Figure 21B:
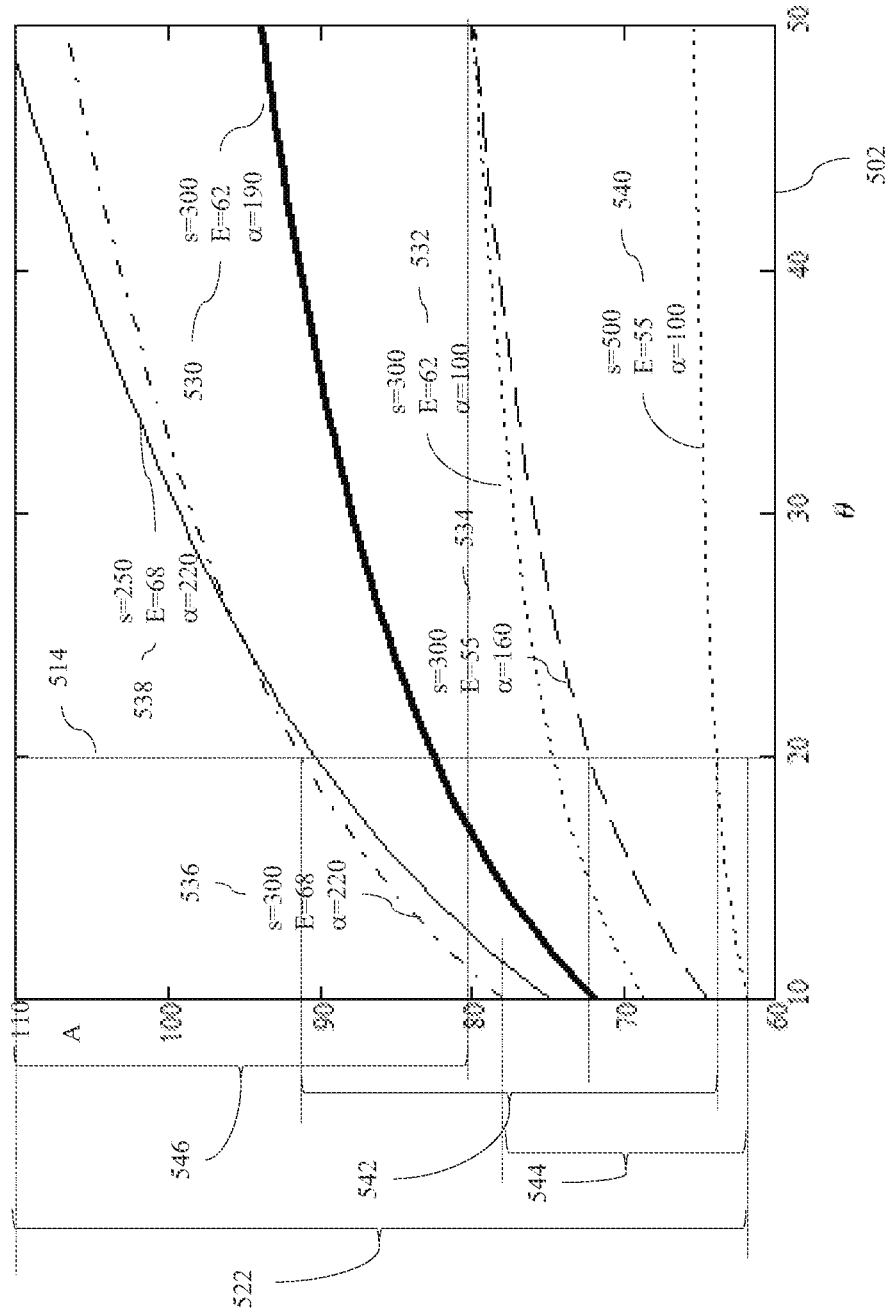

FIG. 21B is a graph of the same quantities as FIG. 21A but plotting additional curves for varying values of the size a of the depth 461 of the head of the source observer 406. The curves show similar values of the size A of the camera separation 450 to FIG. 21A. In particular, the curves 530, 532, 534, 536, 538, 540 show the size A of the separation 450 of the cameras 154, 156 in the stereoscopic display device in: a range 542 with a lower limit of 60 mm and an upper limit of 95 mm for a capture half-angle 454 of size θ of 20°, in a range 544 with a lower limit of 60 mm and an upper limit of 80 mm for a capture half-angle 454 of size θ of 10°, 546 with a lower limit of 75 mm and an upper limit of 110 mm for a capture half-angle 454 of size θ of 50°, and 522 with a lower limit of 60 mm and an upper limit of 110 mm.

FIGS. 21A-B suggest slightly larger ranges of optimum display width to preserve head roundness given a larger range of field angles.

Given the results discussed above, to achieve the desired roundness for a significant proportion of the population, the separation 450 between the centers of the cameras 154, 156 may have a size A in a range having a lower limit of 60 mm and an upper limit of 110 mm. More preferably the lower limit may be 65 mm or 70 mm. More preferably, the upper limit may be 100 mm or 90 mm.

Such values of the separation 450 are particularly suitable for typical values of the lateral capture half-angle that of at most 50° or more preferably at most 30°. Such values of the separation 450 are particularly suitable for typical values of the lateral capture half-angle that of at least 10°. Such values of the separation 450 are particularly suitable for typical values of the distance 464 of the window plane from the display device 162 of at least 200 mm. Such values of the separation 450 are particularly suitable for typical values of the distance 464 of the window plane from the display device 162 of at most 400 mm.

Such parameters may be applied to any of the telecommunication devices disclosed herein, or more generally to any other electronic device that includes a display device that is capable of displaying stereo images autostereoscopically and a pair of stereoscopic cameras positioned outside opposed sides of the display device at the same level partway along those sides.

Figure 22:
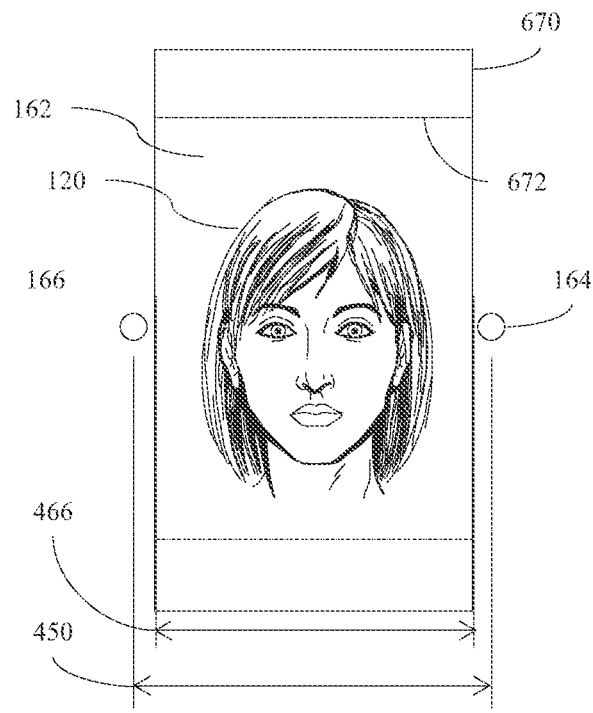
FIG. 22 is a schematic diagram illustrating the front view of a source or destination telecommunications device for a portrait orientation autostereoscopic telecommunications system arranged to achieve perceived head roundness, in accordance with the present disclosure.
Figure 23:
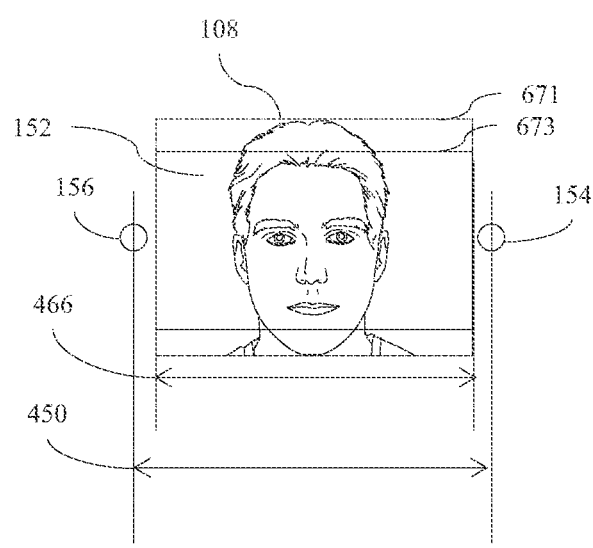
FIG. 23 is a schematic diagram illustrating the front view of a source or destination telecommunications device for a landscape orientation autostereoscopic telecommunications system arranged to achieve perceived head roundness, in accordance with the present disclosure.

FIGS. 22-23 are schematic diagrams illustrating front views of the display devices 162 and 152 of destination and source telecommunication devices 160 and 150 for an autostereoscopic telecommunications system arranged to achieve perceived head roundness. Thus in an illustrative embodiment, for a nominal desirable camera separation 450 of size A=83 mm, a destination telecommunication device 160 device as shown in FIG. 22 may be arranged in portrait mode with a lateral display width of 79 mm, that is with the pair of stereoscopic cameras 164, 146 positioned outside the longer opposed sides of the display device 162. Such a display device can be achieved by a 4:3 aspect ratio panel boundary 672 of diagonal size 5.2" or a 16:9 aspect ratio panel boundary 670 of diagonal size 6.3".

Alternatively, as shown in FIG. 23, the display device 152 may in another illustrative embodiment be arranged in landscape mode with a lateral display width W of 79 mm, that is with the pair of stereoscopic cameras 154, 156 positioned outside the shorter opposed sides of the display device 162. Such a display device 152 can be achieved by a 4:3 aspect ratio panel boundary 671 of diagonal size 3.9" or a 16:9 aspect ratio panel boundary 673 of diagonal size 3.6".

Increasing the display width and thus camera separation 450 will distort the transfer function 405, and result in Pinocchio type effects.

Whilst the above discussion is concerned with the perceived roundness of the head 406 of the source observer 100, there will now be discussed the background 414. Referring to FIG. 17, in order to achieve roundness (and a linear transfer function 405 in the region of the head 406 of the source observer 100), the camera separation 450 of the source telecommunication device 150 may be desirably arranged at a size A such that the background object 414 may be displayed on the destination telecommunication device 160 with disparity between left and right images that may be outside ranges that can achieve comfortable levels of convergence for observers. Such disparities may result in excessive visual strain. Thus it has been appreciated that the desired results of roundness of head shape and background images without excessive disparity cannot be achieved by the same capture geometry in typical use for telecommunication devices.

Thus, it is desirable to achieve the mapping function 420 in which the image 416 of the background 414 has a degree of perceived stereoscopic depth that is compressed to an image with no depth or limited depth, so that background 414 is directed to width 423 with little or no perceived depth. There will now be described a method that achieves this, implemented as part of a teleconferencing method. This method may be implemented in a telecommunication system as described above with reference to FIG. 2 in which the source telecommunication device 150 includes a stereoscopic pair of cameras 154, 156 and the destination telecommunication device 160 includes an autostereoscopic display device 162 that is capable of displaying stereo images autostereoscopically.

The method is illustrated with reference to FIGS. 24A-24G which are schematic diagrams each illustrating a pair of left and right images of a stereo delivery image as they are processed by the method to apply image corrections to correct the background stereoscopic depth for an autostereoscopic telecommunications system further arranged to achieve perceived head roundness. FIG. 25 is a flow chart of the method itself.

Steps 700 to 718 of the method are image processing steps that may be performed in one or more image processing section of one or more components of the telecommunication system. Possible components include the source telecommunication device 150, the destination telecommunication device 160 or a server in the telecommunication network 199 through which the delivery images are transmitted. The image processing sections may be implemented by any suitable processing elements, for example a processer executing a suitable computer program or by dedicated hardware or by some combination of software and hardware.

Figures 24A, 24B, 24C, 24D:
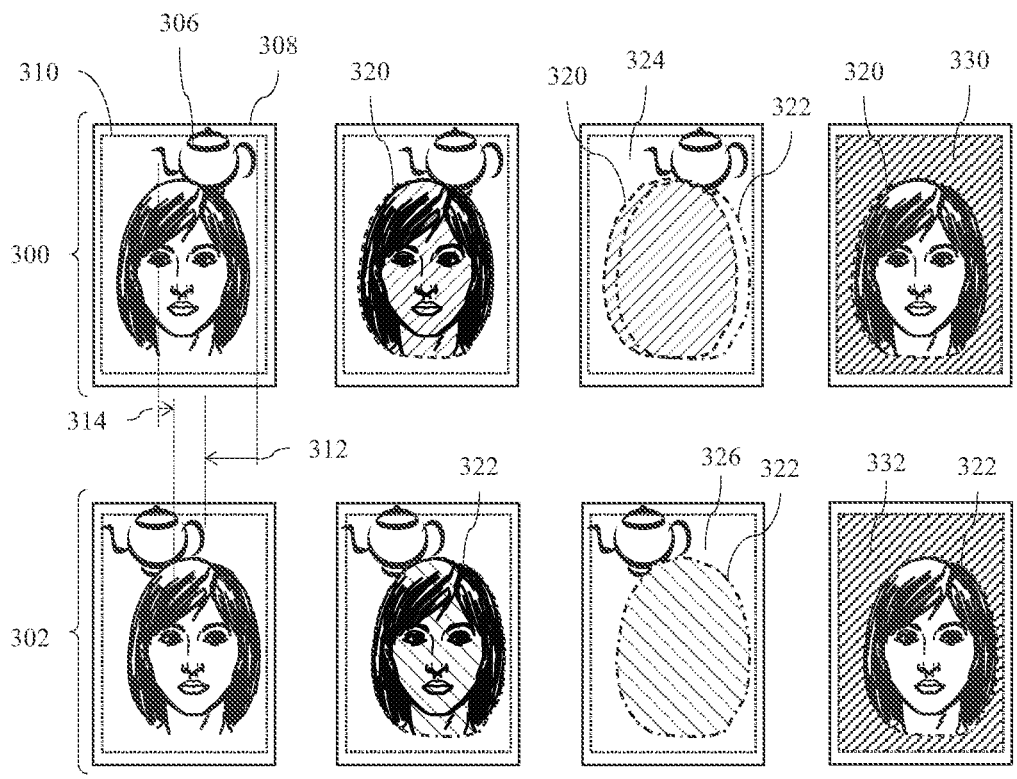
FIGS. 24A-G are schematic diagrams illustrating image corrections of a method to correct the background depth of source images for an autostereoscopic telecommunications system further arranged to achieve perceived head roundness, in accordance with the present disclosure.
Figure 25:
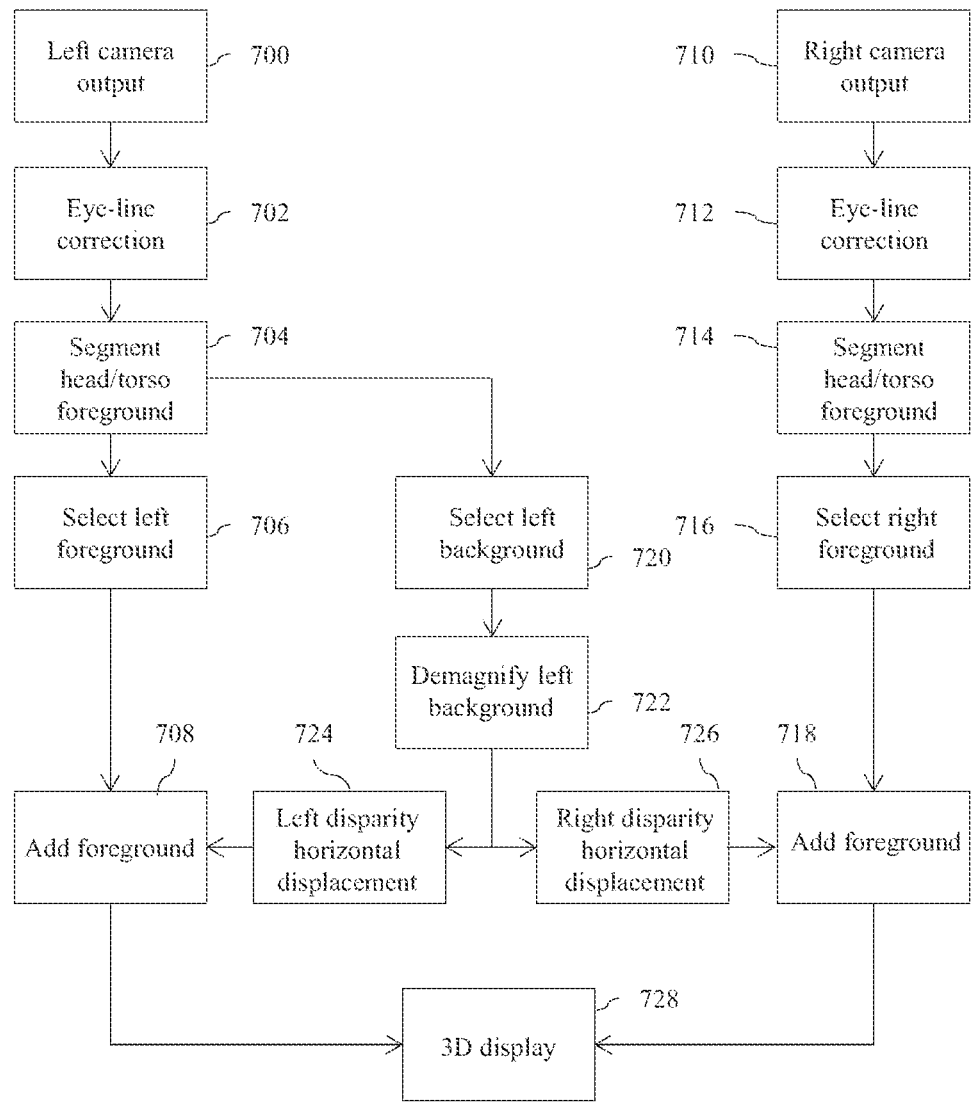
FIG. 25 is a schematic diagram further illustrating in a flow chart the method of FIGS. 24A-G to correct the background depth of source images using the background data of the source images for an autostereoscopic telecommunications system further arranged to achieve perceived head roundness, in accordance with the present disclosure.

FIG. 24A shows an example of the left image 300 and the right image 302 of a stereo delivery image of a head and optionally a torso of observer 100 captured by the stereoscopic pair of cameras 154, 156 of the source telecommunication device 150. In order to achieve perceived roundness of the head 406 during replay, the disparity 314 between the left and right eye images 300, 302 may be substantially different from the disparity 312 of the background, such that the background disparity 312 may be excessive. The image has an outer border 308 and may also have an inner border 310 described further below.

In input steps 700 and 710, the left and right images captured by the cameras 154, 156 are input. In eye-line correction steps 702 and 712 that are optional when the method of FIG. 25 is performed, the left and right images are processed to provide eye-line correction using the method described above with reference to FIG. 4.

In segmentation steps 704 and 714, the left and right images are segmented to identify the regions of the head and if present torso (hereinafter referred to as the "foreground" for brevity) of the images. The foreground may comprise the whole head and torso or parts thereof, for example the face only in which embodiment, the background may comprise for example hair and torso regions. FIG. 24B shows a segmentation of the foreground from the backgrounds to identify the foregrounds 320, 322 of the left and right images (the segmentation region 322 of the right image being shown in dotted outline on the left image for comparison). Similarly, FIG. 24C shows the background images after the foreground is removed, indicating the boundaries of segmentation regions 320, 322 respectively and providing segmented backgrounds 324, 326. FIG. 24D shows the segmented foreground background regions 330, 332 replaced by null image regions.

Segmentation steps 704 and 714 may use any suitable segmentation technique of the known and varied types in the field of computer vision, for example using active and/or passive segmentation technologies. For use in teleconferencing, there may be used any segmentation technique that can process video images in real time, depending on the image size and frame rate, which may depend on the bandwidth available in the telecommunication network 199 for transmission of the stereo delivery images. Besides that, the segmentation technique may be chosen to achieve a desired balance between the available processing resource and the quality of the segmentation.

The next steps together replace the segmented background of the left and right images by replacement images having a degree of perceived stereoscopic depth that is lower than the degree of perceived stereoscopic depth within the original images. In this example, the replacement images for both of the left and right images comprises a common image so that the replacement images provide a planar stereo image having no perceived stereoscopic depth within them. This effectively provides the background with the function 420 shown in FIG. 17.

In this example, the replacement images are derived from one of the segmented backgrounds 324, 326 (in this example the background 324 of the left image but the background 326 of the right image could similarly be used). The new background is derived as follows.

In selection step 722, the segmented background 324 of the left image is selected, and in demagnification step 722 the segmented background 324 is demagnified. Then, in disparity steps 724 and 726, the demagnified, segmented background 324 output by the demagnification step 722 is shifted horizontally in opposite direction to generate two versions of the demagnified, segmented background 324 with horizontal disparity, which are used as the left and right replacements images 325, 327.

Figures 24E, 24F, 24G:
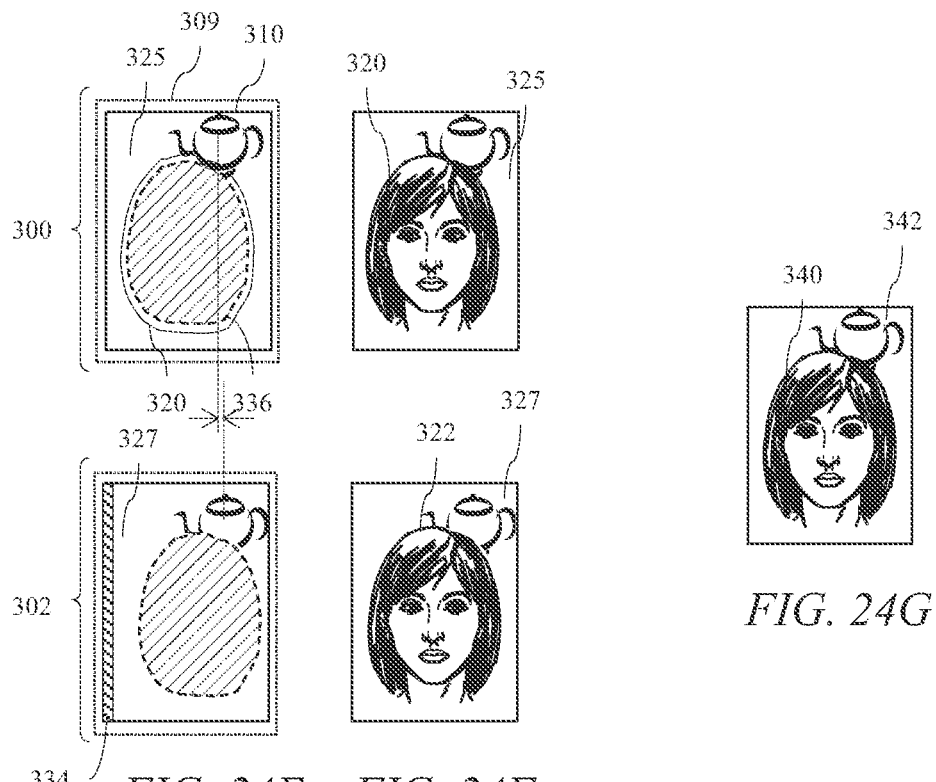

FIG. 24E shows the step of deriving the left and right replacement images 325, 327 derived from the demagnified, segmented background 324 shown in FIG. 24C. Due to the demagnification, the outer boundary 308 of the original left image 300 is shrunk to the size of the inner boundary 310, reducing the size of the replacement images 325, 327. This ensures that the boundary 336 of the replacement images 325, 327 around the foreground shrinks to the extent that it is entirely inside the region of the segmented foregrounds 320, 322 of both the left and right images. This prevents there being a blank region when the segmented foreground 320 of the right image is superimposed on the left replacement images 325 as described below.

The segmented backgrounds in the left and right images are replaced by the left and right replacements images 325 and 327 as follows. In selection steps 706, 716, the segmented foregrounds 320, 322 of the left and right images are selected and in steps 708, 718, segmented foregrounds 320, 322 of the left and right images are superimposed on the left and right replacements images 325, 327 derived in steps 724, 726. FIG. 24F shows the resultant left and right images. The edge region between borders 308, 310 may be removed from the resultant images.

As the left and right replacement images 325, 327 comprise a common image, that is the demagnified, segmented image 324, with a horizontal disparity 336, the replacement images 325, 327 have a perceived stereoscopic depth behind the foreground to achieve the appropriate disparity for the background. The background disparity 336 may be set so that the background is set at the rear of the observer's ears, at the back of their head, or preferably behind the back of their head to avoid conflict with depth cues in the stereoscopic reproduction of the head.

Due to the shifting used to provide disparity between the left and right replacement images 325, 327, a region 334 may be present that has no image information. Such an effect can be reduced by increasing the lateral field of capture of the stereoscopic cameras 154, 156 to capture excess information.

In display step 728, the stereo delivery image comprising the left and right images having the replaced, segmented backgrounds generated in steps 708, 718 are displayed autostereoscopically on the display device 162 of the destination telecommunication device 160.

FIG. 24G shows the displayed stereo delivery image including a segmented foreground region 340 comprising a range of disparity information to achieve face roundness and a background region 342 comprising planar background information with a disparity that is set behind the observer's head but has lower disparity 336 than the disparity 312 of the source background images. Thus in each of the stereo delivery images, the segmented backgrounds are replaced by respective replacement images that have a degree of perceived stereoscopic depth within the replacement images that is lower than degree of perceived stereoscopic depth within the original backgrounds.

Advantageously a stereoscopic teleconferencing system can achieve correct gaze characteristics, correct face roundness characteristics and a background image with high levels of visual comfort arising from lower levels of background disparity than would be achieved from the raw background images.

In this example, as the replacement images 325, 327 are derived from one of the segmented backgrounds 324, 326, the viewer still perceives the actual background that is behind the observer 100 captured by the stereoscopic pair of cameras 154, 156 of the source telecommunication device 150. This produces a very natural effect.

As an alternative when the replacement images 325, 327 are derived from one of the left and right eye images 300, 302, the replacement images 325, 327 could be derived with a degree of stereoscopic depth that is lower than degree of perceived stereoscopic depth within the original backgrounds. However, that requires significant image processing to generate appropriate background images, and in some cases might not even be practicable with the available processing power. Accordingly, deriving replacement images 325, 327 that are a common image derived from one of the left and right eye images 300, 302 may achieve a similar effect with greater ease and lower processing power.

However, the replacement images 325, 327 need not be derived from the left and right eye images 300, 302, as for example in the following alternative methods.

An alternative method is illustrated with reference to FIGS. 26A-26D which are schematic diagrams each illustrating a pair of left and right images of a stereo delivery image as they are processed by the method to apply image corrections to correct the background stereoscopic depth for an autostereoscopic telecommunications system further arranged to achieve perceived head roundness. FIG. 27A is a flow chart of the method itself.

Figure 27A:
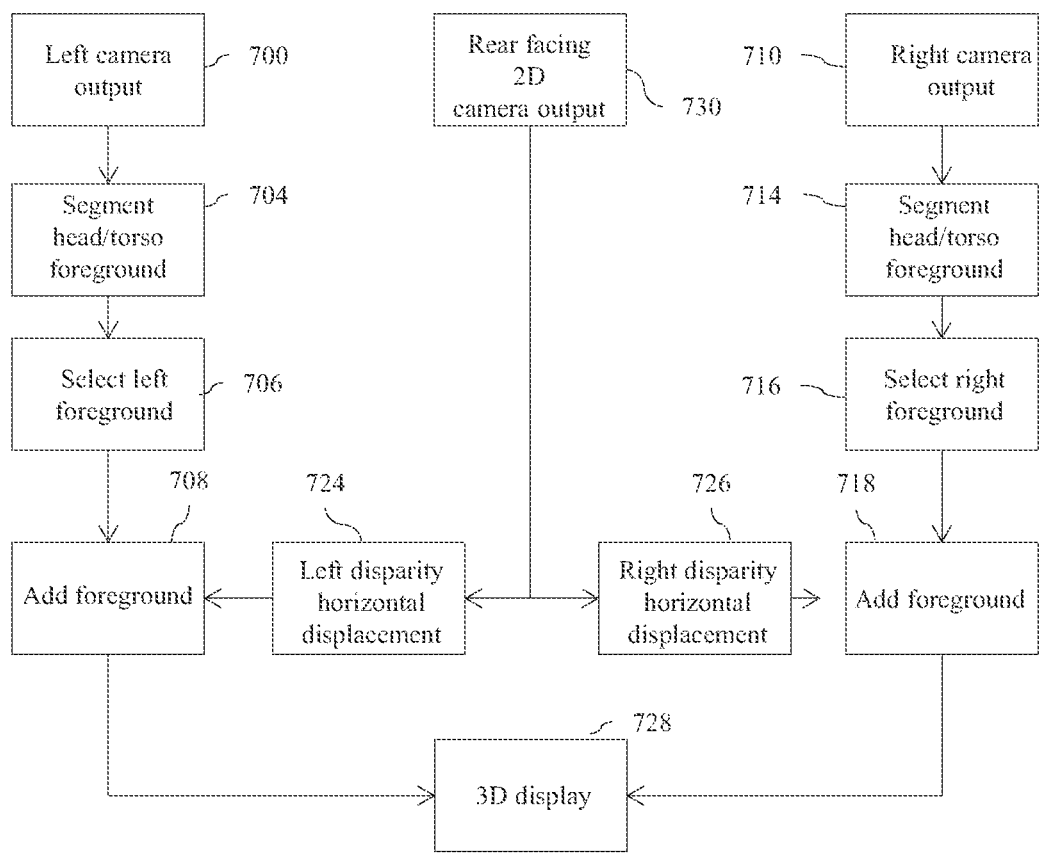
FIG. 27A is a schematic diagram further illustrating in a flow chart the method of FIGS. 26A-D to correct the background depth of source images using a backward facing monoscopic camera for an autostereoscopic telecommunication system further arranged to achieve perceived head roundness, in accordance with the present disclosure.
Figure 27B:
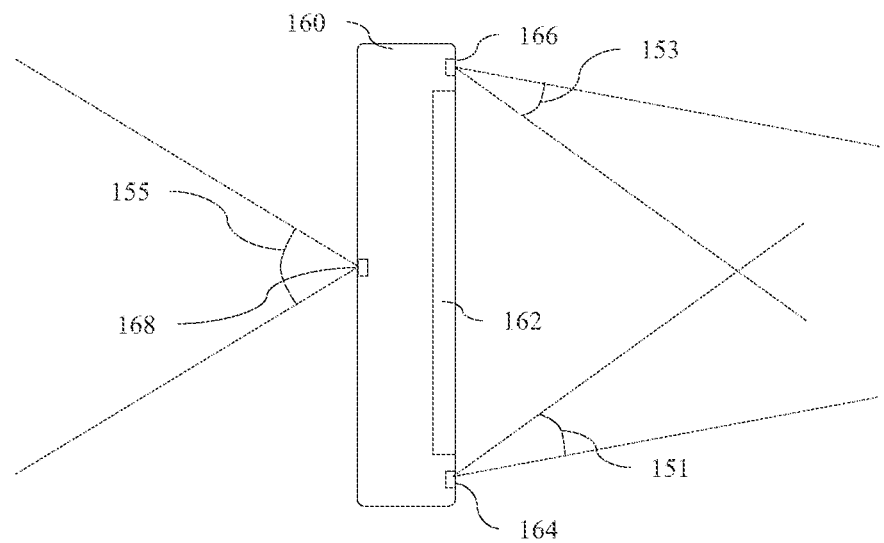
FIG. 27B is a schematic diagram of a destination telecommunication device having a rearwards facing camera, in accordance with the present disclosure.

The alternative method is the same as the method of FIG. 25 except for the following modification. The alternative method is applied to a destination telecommunication device as illustrated in FIG. 27B having a rear monoscopic camera arrangement 168 facing in the opposite direction from the display device 162, and from the stereoscopic pair of cameras 164, 166, that is facing in the same direction as the source observer towards the outside world. Lateral camera capture full angles 151, 153 may be different to capture angle 155 of camera 168, with the former arranged to achieve teleconferencing preserving head roundness, while the latter is arranged to achieve suitable field of view for more general photography and videophotography uses.

Figure 26A:
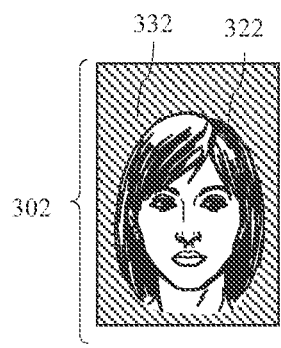
FIGS. 26A-D are schematic diagrams illustrating image corrections of a further method to correct the background depth of source images for an autostereoscopic telecommunications system further arranged to achieve perceived head roundness, in accordance with the present disclosure.
Figure 26B:
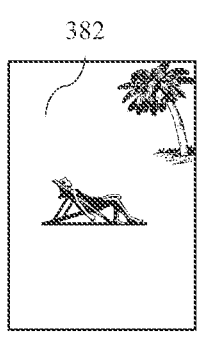
Figure 26C:
Figure 26D:

The alternative method differs in that the left and right images replacement images 380, 382 are derived from the image captured by the rear camera arrangement 168, in particular comprising a common image captured by the rear camera, as shown in FIG. 26B. Thus, in input step 730 the image captured by the rear camera arrangement 168 is input and this is used in steps 724, 726. Otherwise the method remains the same as described above, so that FIGS. 26A, 26C and 26D correspond to FIGS. 24D, 24F and 24G.

Figure 27C:
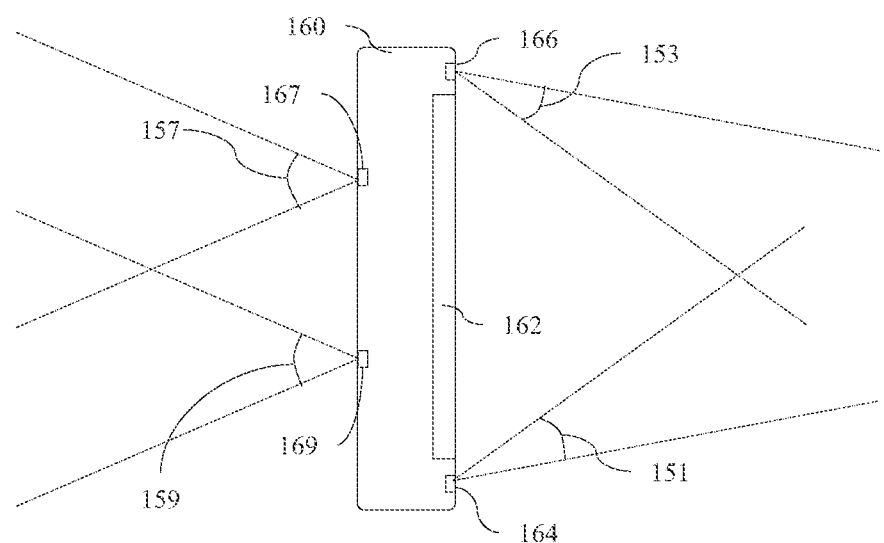
FIG. 27C is a schematic diagram of a destination telecommunication device having a rearwards facing pair of stereo cameras, in accordance with the present disclosure.

As shown in FIG. 27C the rear camera 168 may be replaced by a stereoscopic pair of cameras 167, 169, in which case the background image may be a stereo image pair comprising left and right images 380, 382. Thus the assembled stereoscopic image 384 shown in FIG. 26D may include a foreground with correct roundness properties and a background with acceptable levels of disparity. Lateral camera capture full angles 151, 153 may be different to capture angles 157 159, with the former arranged to achieve teleconferencing preserving head roundness, while the latter arranged to achieve suitable field of view for more general stereophotography; said cameras 167, 169 may thus be arranged with fields of view and separation in a manner that would provide head distortion if they were to be used in a teleconferencing application.

Figure 28:
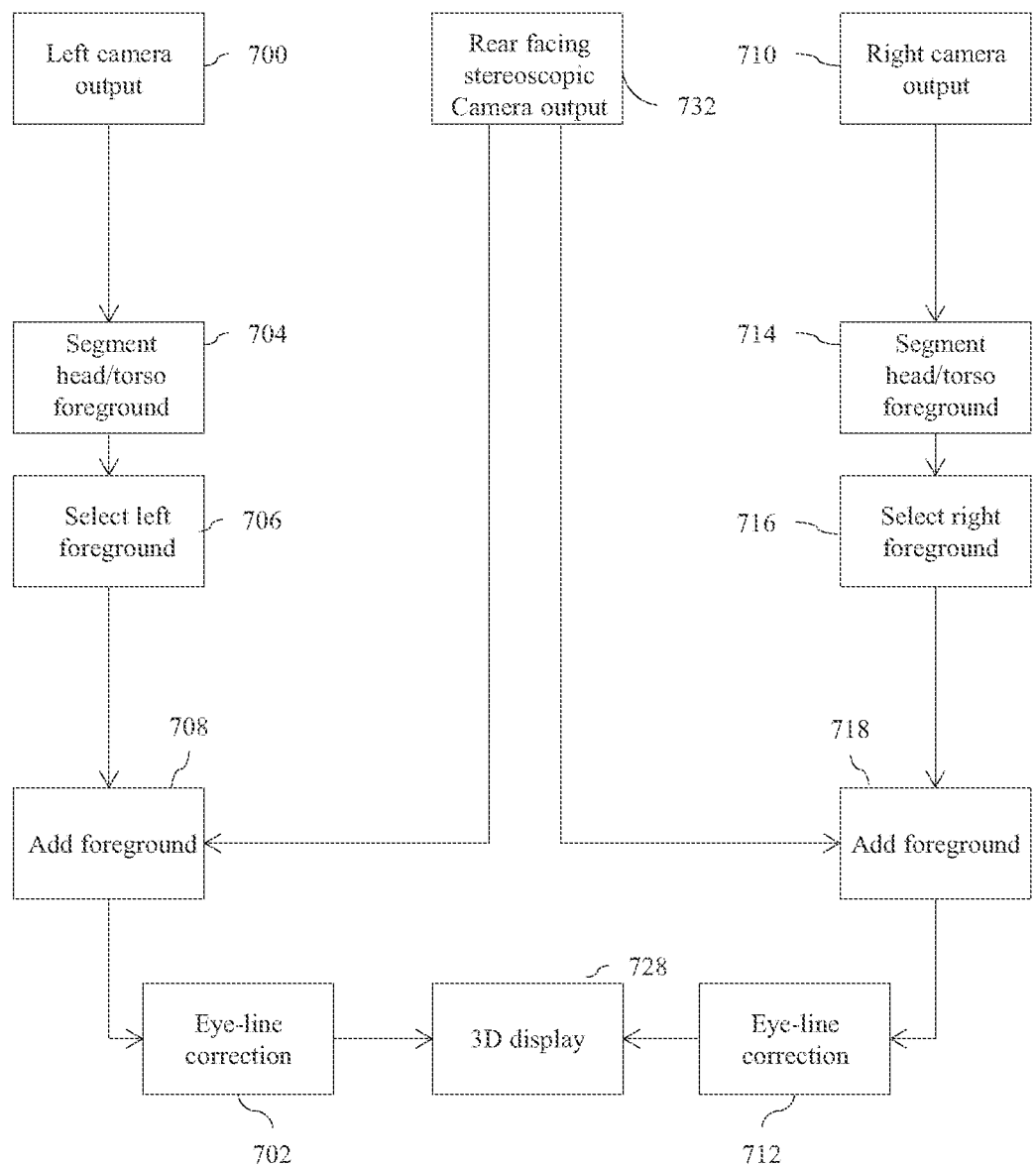
FIG. 28 is a schematic diagram illustrating in a flow chart a further method to correct the background depth of source images using a backward facing stereoscopic camera for an autostereoscopic telecommunications system further arranged to achieve perceived head roundness, in accordance with the present disclosure.

FIG. 28 is a flow chart of the method in this case, wherein in input step 732 the left and right images captured by the rear camera arrangement 168 are input and are used in steps 708 and 718 as the left and right replacement images. Otherwise the method remains the same as described above, except that the eye-line correction steps 702, 712 are performed after replacement of the background (which is also a possible modification to the methods of FIGS. 25 and 27A). Advantageously the use of the rear camera arrangement 168 in telecommunication use achieves control by the user of what is seen by the observer of the destination image in the background. This avoids the uncertainty of not being able to see what is behind you in social interactions and increases the level of perceived control of the interface.

In all of the above examples, the replacement images are derived from images captured by a camera of the source telecommunication device 150. Alternatively, the replacement images could be derived separately, for example being images that are stored or images that generated during the communication from the source telecommunication device 150 to the destination telecommunication device 160.

The image processing performed in steps may be performed in any device or any combination of devices of the telecommunication system through which the delivery images pass, including without limitation the source telecommunication device 150, the destination telecommunication device 160 or a server in the telecommunication network 199 through which the images are transmitted. Some non-limitative examples of this are shown in FIGS. 29-31 are schematic diagrams illustrating communication between source and destination devices 150 and 160 arranged to achieve correction of the background of delivery and return images.

Figure 29:
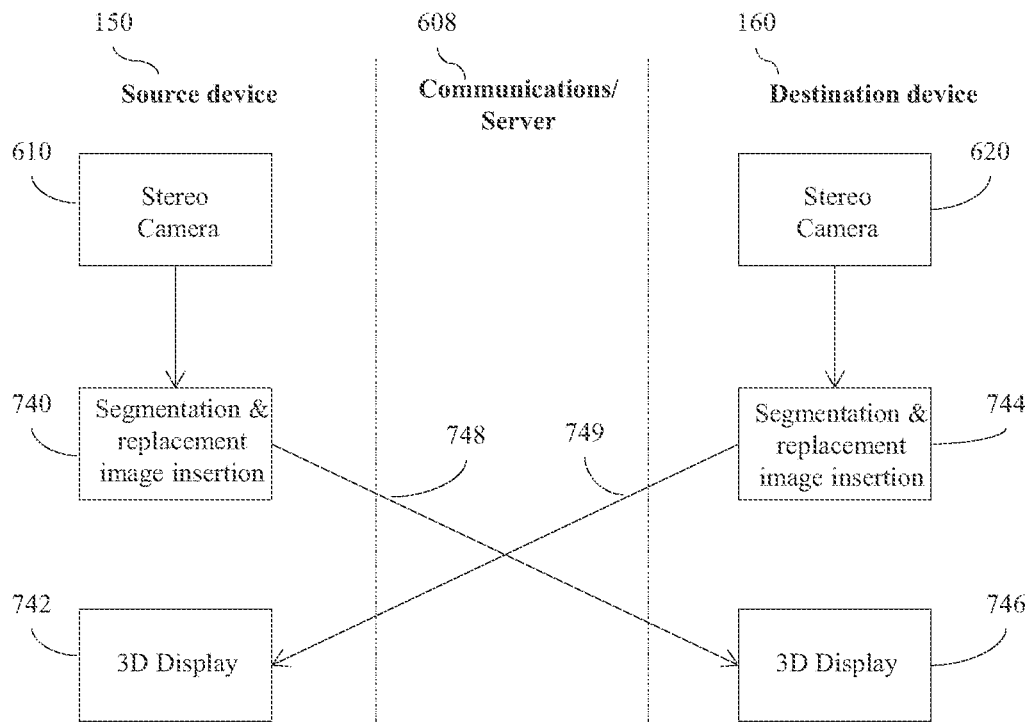
FIGS. 29-31 are schematic diagrams illustrating means of communication between source and destination devices arranged to achieve correction of the background of delivery and return images, in accordance with the present disclosure.
Figure 30:
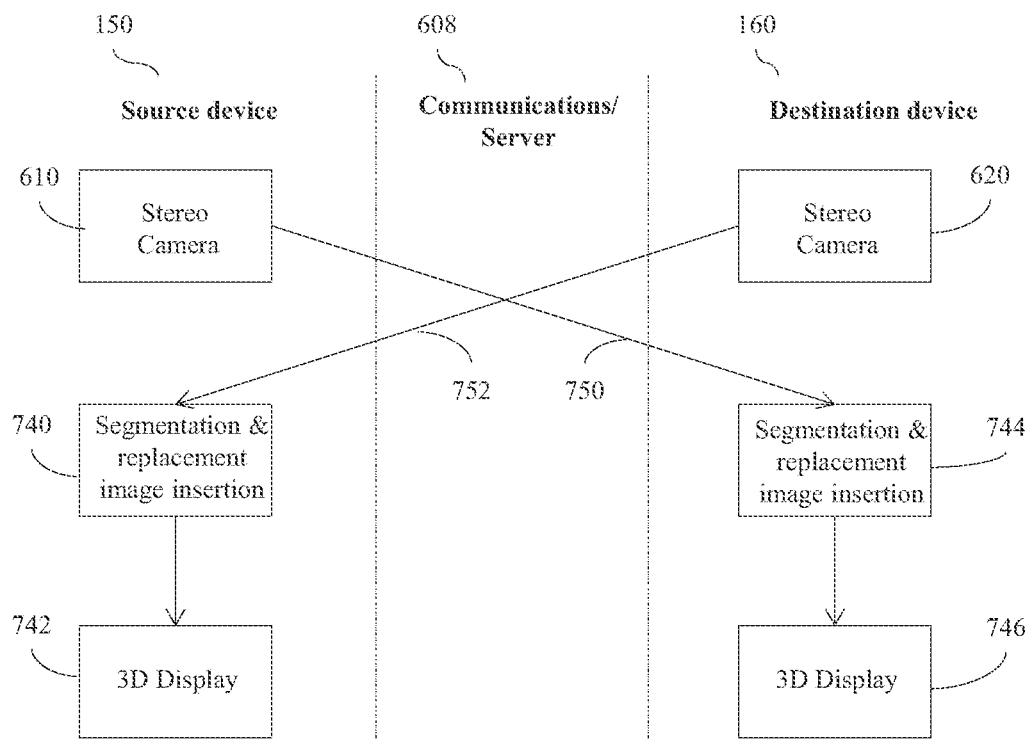
Figure 31:
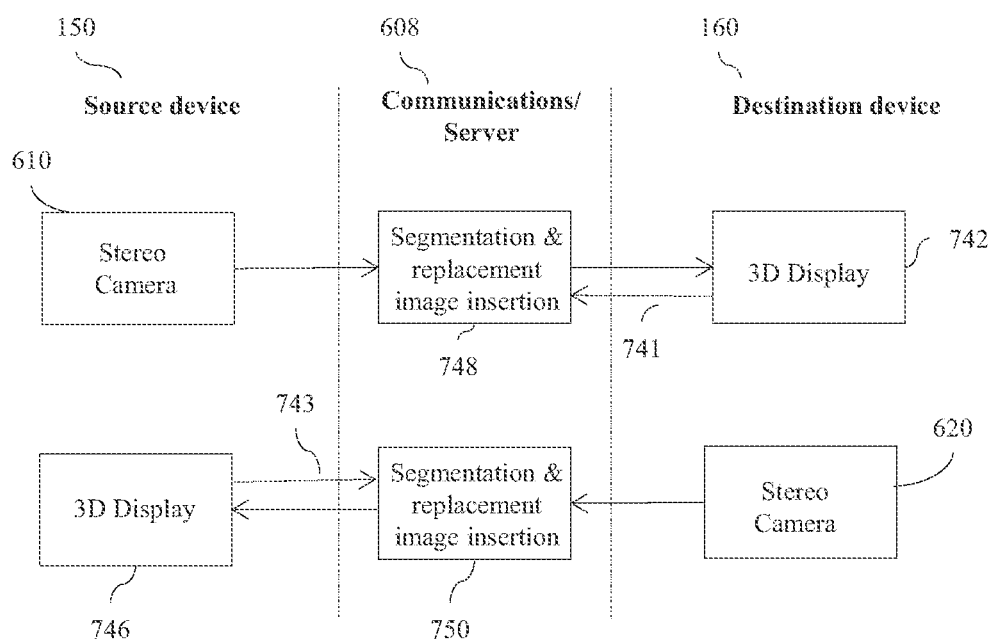

In particular FIGS. 29-31 show examples in which the methods are applied bi-directionally to the return images 108 and the delivery images 120, and the location in which the return images 108 and the delivery images 120 are processed is symmetrical. In each of these examples, stereo delivery images captured by a stereoscopic pair of cameras 610 of the source telecommunication device 150 are displayed autosterescopically on a display device 746 of the destination telecommunication device 160, and stereo return images captured by a stereoscopic pair of cameras 620 of the destination telecommunication device 160 are displayed autosterescopically on a display device 742 of the source telecommunication device 150.

In the method of FIG. 29, the background replacement method is performed on the delivery images by an image processing section 740 of the source telecommunication device 150, and the background replacement method is performed on the return images by an image processing section 744 of the destination telecommunication device 160, following which image 748, 749 having the replaced backgrounds is sent to the 3D display devices 746, 742 of the other of the destination and source telecommunication devices 160 and 150. Advantageously the sender can choose the replacement image content.

In FIG. 30, the background replacement method is performed on the delivery images by an image processing section 744 of the destination telecommunication device 160, and the background replacement method is performed on the return images by an image processing section 740 of the source telecommunication device 150 so that unprocessed stereo images 750, 752 are transferred and the processing occurs on the respective destination and source devices 160, 150 respectively. In this case, the replacement image also needs to be transmitted, or alternatively an image from a camera where the processing is performed may be used in which case advantageously the recipient of the image can choose the replacement image content.

In FIG. 31, the background replacement method is performed on the delivery images by an image processing section 748 of a server 608 in the telecommunication network 199 through which the images are transmitted, and the background replacement method is performed on the return images by an image processing section 748 of a server 608 in the telecommunication network 199 through which the images are transmitted. Thus, unprocessed images are transmitted to the server 608 which transmits on images with replaced the backgrounds. Data 741, 743 may be passed from the destination and source devices 160, 150 respectively to the server 608 to determine the requirement of disparity of background data in the replacement images. Advantageously a choice between sender, recipient, or a third party, such as a sponsoring advertiser may determine the nature of the replacement image content. Further the requirement for local processing of image data can be reduced, reducing cost and complexity of source and destination devices.

The autostereoscopic display devices 152 and 162 may be any type of display device that is capable of displaying stereo images without additional equipment worn by the observer. Non-limitative examples of types of display device that are suitable for the autostereoscopic display of the present embodiments include but are not limited to wedge display devices, lenticular display devices, parallax barrier display devices, beam splitter display devices and light line display devices.

As an alternative, the autostereoscopic display device could be replaced by a stereoscopic display device. Stereoscopic display devices may include but are not limited to micropolarizer display devices, film patterned retarder display devices or shutter glasses display devices. Stereoscopic display devices rely on head-mounted equipment such as a pair of glasses to provide the stereoscopic effect, so the visibility of the relative iris and sclera positions of observer eyes may be compromised.

The autostereoscopic display devices 152 and 162 may be time multiplexed, that is providing the left and right images to the left and right eyes in a time multiplexed manner. Time multiplexed autostereoscopic display devices can advantageously improve the spatial resolution of autostereoscopic display device by directing light from all of the pixels of a spatial light modulator to a first viewing window in a first time slot, and all of the pixels to a second viewing window in a second time slot. Thus an observer with eyes arranged to receive light in first and second viewing windows will see a full resolution image across the whole of the display device over multiple time slots. Time multiplexed display devices can advantageously achieve directional illumination by directing an illuminator array through a substantially transparent time multiplexed spatial light modulator using directional optical elements, wherein the directional optical elements substantially form an image of the illuminator array in the window plane.

Figure 32:
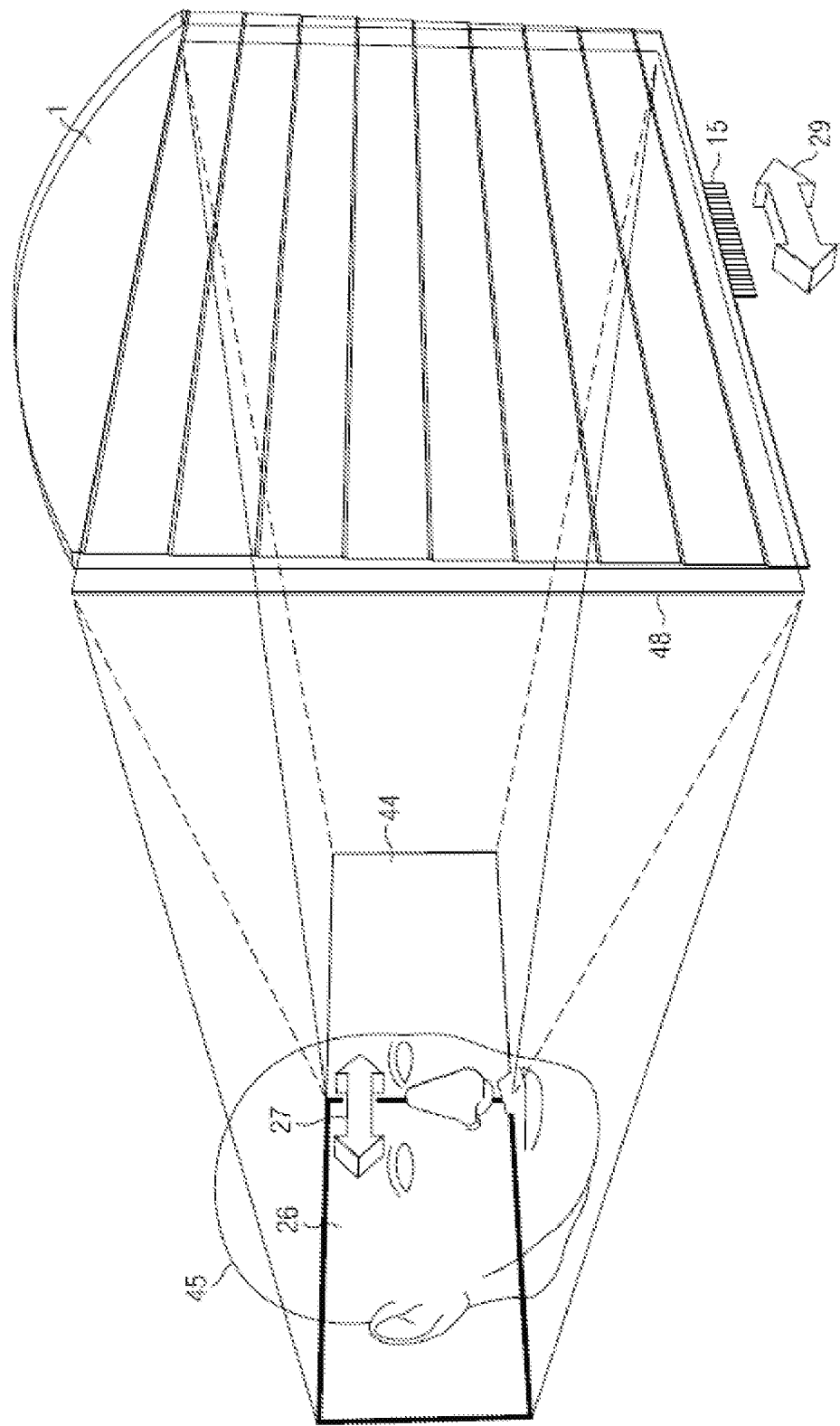
FIG. 32 is a schematic diagram illustrating the structure of one type of an autostereoscopic display for an autostereoscopic telecommunications system, in accordance with the present disclosure.

The autostereoscopic display device may be of the type disclosed in U.S. patent application Ser. No. 13/300,293, filed 18 Nov. 2013, which is incorporated herein by reference. FIG. 32 is a schematic diagram illustrating the structure of one type of an autostereoscopic display device for an autostereoscopic telecommunications system, as described in U.S. patent application Ser. No. 13/300,293. Herein a stepped waveguide 1 (also referred to as an optical valve) is arranged to direct light from an array 15 of light sources to left viewing window 44 and right viewing window 26. As the observer moves indicated by arrow 27, the light sources may be adjusted to move the viewing windows, achieving autostereoscopic imaging for observer 45. Thus the viewing windows are arranged at a nominal distance from the display device by means of the imaging properties of the stepped waveguide 1. Such nominal viewing distance determines the best viewing position for an observer.

Figure 33:
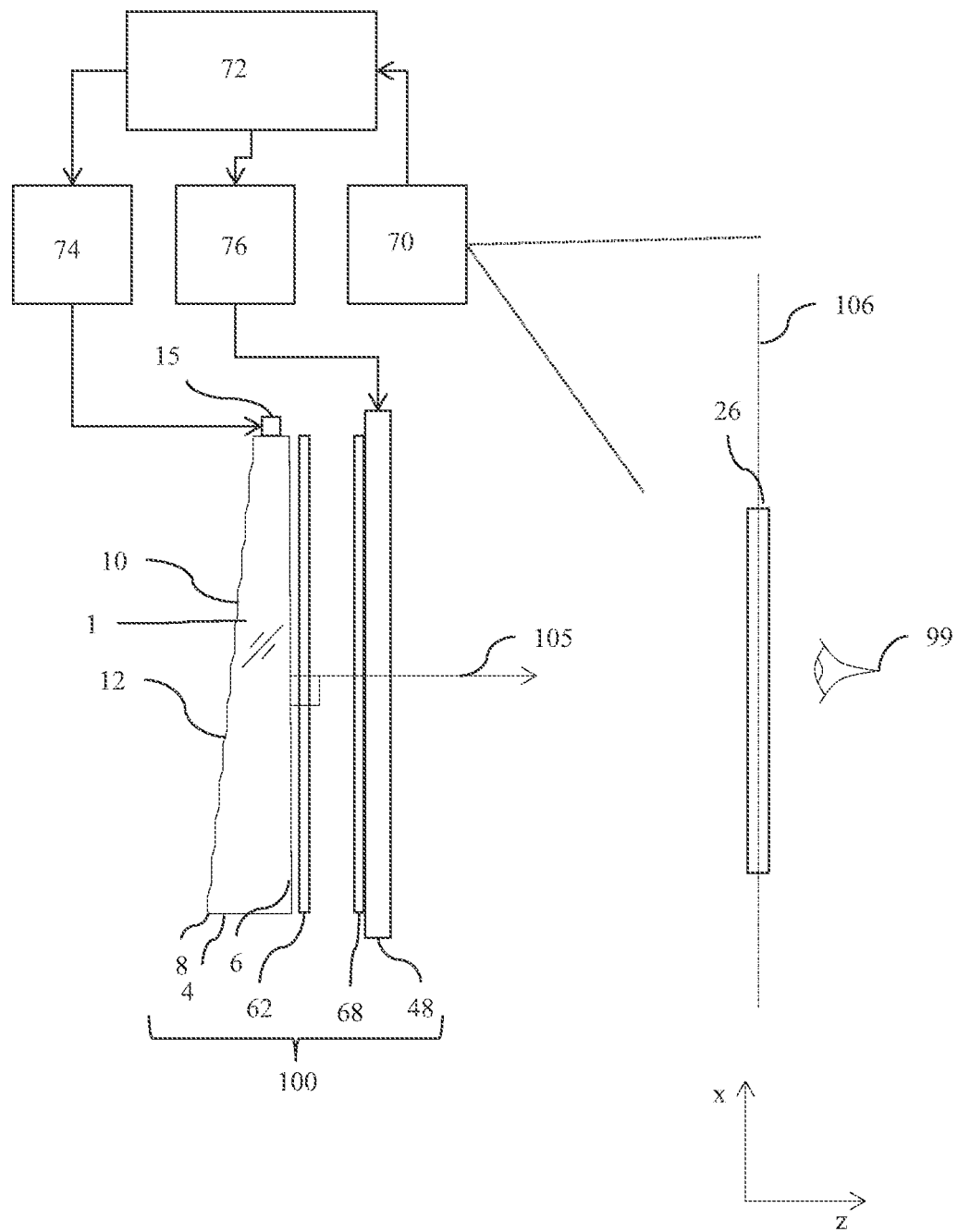
FIG. 33 is a schematic diagram illustrating a control system for an autostereoscopic display for an autostereoscopic telecommunications system, in accordance with the present disclosure.

FIG. 33 is a schematic diagram illustrating a control system for an autostereoscopic display device for an autostereoscopic telecommunications system. The arrangement and operation of the control system will now be described and may be applied to an autostereoscopic display device of the type disclosed in U.S. patent application Ser. No. 13/300,293. As illustrated in FIG. 33, a directional display device 100 may include a directional backlight device that may itself include a stepped waveguide 1 and a light source illuminator array 15. As illustrated in FIG. 33, the stepped waveguide 1 includes a light directing side 8, a reflective end 4, guiding features 10 and light extraction features 12. The directional display device 100 may further include an SLM 48.

The waveguide 1 is arranged as described above. The reflective end 4 converges the reflected light. A Fresnel lens 62 may be arranged to cooperate with reflective end 4 to achieve viewing windows 26 at a viewing plane 106 observed by an observer 99. A transmissive SLM 48 may be arranged to receive the light from the directional backlight. Further a diffuser 68 may be provided to substantially remove Moiré beating between the waveguide 1 and pixels of the SLM 48 as well as the Fresnel lens structure 62.

The control system may include a sensor system arranged to detect the position of the observer 99 relative to the display device 100. The sensor system includes a position sensor 70, such as a camera, and a head position measurement system 72 that may for example be a computer vision image processing system. The control system may further include an illumination controller 74 and an image controller 76 that are both supplied with the detected position of the observer supplied from the head position measurement system 72.

The illumination controller 74 selectively operates the illuminator elements 15 to direct light to into the viewing windows 26 in cooperation with waveguide 1. The illumination controller 74 selects the illuminator elements 15 to be operated in dependence on the position of the observer detected by the head position measurement system 72, so that the viewing windows 26 into which light is directed are in positions corresponding to the left and right eyes of the observer 99. In this manner, the lateral output directionality of the waveguide 1 corresponds with the observer position.

The image controller 76 controls the SLM 48 to display images. To provide an autostereoscopic display device, the image controller 76 and the illumination controller 74 may operate as follows. The image controller 76 controls the SLM 48 to display temporally multiplexed left and right eye images. The illumination controller 74 operate the light sources 15 to direct light into respective viewing windows in positions corresponding to the left and right eyes of an observer synchronously with the display of left and right eye images. In this manner, an autostereoscopic effect is achieved using a time division multiplexing technique.

The various features of the above described embodiments may be combined together in any combination.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. A method of generating stereoscopic images, comprising:
    capturing stereo images that are video images of a head and, optionally, a torso by a stereoscopic pair of cameras;
    in each of the stereo images, segmenting the head and, if present, the torso from the backgrounds, thereby producing segmented backgrounds; and
    in each of the stereo images, replacing the segmented backgrounds by respective replacement images that have a degree of perceived stereoscopic depth within the replacement images that is lower than a degree of perceived stereoscopic depth within the original backgrounds.

2. A method according to claim 1, wherein the replacement images comprise a common replacement image so that the replacement images have no perceived stereoscopic depth within them.

3. A method according to claim 2, wherein the replacement images comprise the common replacement image with a horizontal disparity so that the replacement images have a perceived stereoscopic depth behind the segmented head and, if present, torso.

4. A method according to claim 2, further comprising deriving the respective replacement images from at least one of the segmented backgrounds.

5. A method according to claim 4, wherein deriving the respective replacement images from the segmented backgrounds comprises deriving a common replacement image from the segmented background of one of the captured images and deriving the replacement images as images comprising the common replacement image.

6. A method according to claim 5, wherein deriving the common replacement image comprises demagnifying the segmented background of said one of the captured images.

7. A method according to claim 5, wherein deriving the replacement images as images comprising the common replacement image comprises generating two versions of the common replacement image with horizontal disparity, as the respective replacement images.

8. A method according to claim 1, further comprising using a telecommunication device comprising a display device, a stereoscopic pair of cameras facing in the same direction as the display device and at least one rear camera facing in the opposite direction from the stereoscopic pair of cameras; and
    deriving the respective replacement images from at least one image captured by the at least one rear camera.

9. A method according to claim 8, wherein deriving the respective replacement images comprises deriving the replacement images as images comprising a common replacement image captured by the at least one rear camera.

10. A method according to claim 9, wherein deriving the respective replacement images comprises generating two versions of the common image captured by the at least one rear camera with horizontal disparity, as the respective replacement images.

11. A method according to claim 1, wherein the stereoscopic pair of cameras are provided on a source telecommunication device.

12. A method according to claim 11, wherein segmenting the head and, if present, the torso and replacing the segmented backgrounds are performed in the source telecommunication device and further comprises transmitting the stereo images having the replaced, segmented backgrounds from the source telecommunication device to a destination telecommunication device over a telecommunication network.

13. A method according to claim 11, further comprising transmitting the stereo images from the source telecommunication device to a destination telecommunication device over a telecommunication network, the steps of segmenting the head and, if present, the torso and replacing the segmented backgrounds being performed in the destination telecommunication device.

14. A method according to claim 11, further comprising transmitting the stereo images from the source telecommunication device to a destination telecommunication device over a telecommunication network through a server in the telecommunication network, the steps of segmenting the head and, if present, the torso and replacing the segmented backgrounds being performed in the server.

15. A method according to claim 11, further comprising performing the method of generating stereoscopic images during teleconferencing between the source telecommunication device and the destination telecommunication device.

16. A method according to claim 11, wherein the destination telecommunication device comprises a display device that is capable of displaying stereo images autostereoscopically, and the method further comprises displaying the stereo images having the replaced, segmented backgrounds on the display device autostereoscopically.

17. A telecommunication system for providing teleconferencing, comprising:
    a source telecommunication device that comprises a stereoscopic pair of cameras; and
    a destination telecommunication device that comprises a display device that is capable of displaying stereo images autostereoscopically;
    the telecommunication system being arranged to transmit delivery stereo images that are video images of a head and, optionally, a torso, captured by the stereoscopic pair of cameras of the source telecommunication device from the source telecommunication device to the destination telecommunication device over a telecommunication network, the telecommunication system being arranged to process each of the stereo images, by segmenting the head and, if present, the torso from the backgrounds, thereby producing segmented backgrounds and by replacing the segmented backgrounds by respective replacement images that have a first degree of perceived stereoscopic depth within the replacement images that is lower than a second degree of perceived stereoscopic depth within the original backgrounds, and the destination telecommunication device being arranged to display the stereo images having the replaced, segmented backgrounds on the display device autostereoscopically.

18. A source telecommunication device for providing teleconferencing, comprising:

a stereoscopic pair of cameras; and an image processing section arranged to process each of stereo images that are video images of a head and, optionally, a torso captured by the stereoscopic pair of cameras, by segmenting the head and, if present, the torso from the backgrounds, thereby producing segmented backgrounds, and by replacing the segmented backgrounds by respective replacement images that have a degree of perceived stereoscopic depth within the replacement images that is lower than degree of perceived stereoscopic depth within the original backgrounds, the source telecommunication device being arranged to transmit the stereo images having the replaced, segmented backgrounds to a destination telecommunication device over a telecommunication network.

19. A destination telecommunication device for providing teleconferencing, the destination telecommunication device being arranged to receive stereo images that are video images of a head and, optionally, a torso captured by a stereoscopic pair of cameras of a source telecommunication device over a telecommunication network, the destination telecommunication device comprising:

a display device that is capable of displaying stereo images autostereoscopically; and an image processing section arranged to process each of the received stereo images, by segmenting the head and, if present, the torso from the backgrounds, thereby producing segmented backgrounds, and by replacing the segmented backgrounds by respective replacement images that have a degree of perceived stereoscopic depth within the replacement images that is lower than degree of perceived stereoscopic depth within the original backgrounds, the destination telecommunication device being arranged to display the stereo images having the replaced, segmented backgrounds on the display device autostereoscopically.

20. A server for provision in a telecommunication network between a source telecommunication device that comprises a stereoscopic pair of cameras and a destination telecommunication device that comprises a display device of the destination telecommunication device that is capable of displaying stereo images autostereoscopically, the server being arranged to receive stereo images that are video images of a head and, optionally, a torso captured by the stereoscopic pair of cameras of the source telecommunication device during transmission of the stereo images from the source telecommunication device to the destination telecommunication device, the server comprising:

an image processing section arranged to process each of the received stereo images, by segmenting the head and, if present, the torso from the backgrounds, thereby producing segmented backgrounds, and by replacing the segmented backgrounds by respective replacement images that have a degree of perceived stereoscopic depth within the replacement images that is lower than degree of perceived stereoscopic depth within the original backgrounds, the server being arranged to transmit the stereo images having the replaced, segmented backgrounds on to the destination telecommunication device.

* * * * *